United States Patent
Sugano et al.

(10) Patent No.: US 10,144,399 B2
(45) Date of Patent: Dec. 4, 2018

(54) VEHICLE ACCELERATION AND DECELERATION CONTROL DEVICE

(71) Applicant: MAZDA MOTOR CORPORATION, Hiroshima (JP)

(72) Inventors: Takashi Sugano, Hiroshima (JP); Shimpei Kusumoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/301,885

(22) PCT Filed: Nov. 4, 2015

(86) PCT No.: PCT/JP2015/005527
§ 371 (c)(1),
(2) Date: Oct. 4, 2016

(87) PCT Pub. No.: WO2016/075899
PCT Pub. Date: May 19, 2016

(65) Prior Publication Data
US 2017/0021812 A1    Jan. 26, 2017

(30) Foreign Application Priority Data

Nov. 10, 2014    (JP) .................................. 2014-228058

(51) Int. Cl.
*B60T 8/24*    (2006.01)
*B60T 8/00*    (2006.01)
(Continued)

(52) U.S. Cl.
CPC ............. *B60T 8/246* (2013.01); *B60T 7/22* (2013.01); *B60T 8/00* (2013.01); *B60T 8/171* (2013.01);
(Continued)

(58) Field of Classification Search
None
See application file for complete search history.

(56) References Cited

U.S. PATENT DOCUMENTS

2007/0078584 A1* 4/2007 Nakamura ............... B60T 7/22
701/93
2008/0059037 A1* 3/2008 Isaji .................... B60W 40/072
701/93
(Continued)

FOREIGN PATENT DOCUMENTS

JP    2011-073534 A    4/2011
JP    2011-088576 A    5/2011
(Continued)

OTHER PUBLICATIONS

Robert Oshana & Mark Kraeling, Software Engineering for Embedded Systems: Methods, Practical Techniques, and Applications (2013) (Year: 2013).*

(Continued)

*Primary Examiner* — Tamara L Weber
(74) *Attorney, Agent, or Firm* — Studebaker & Brackett PC

(57) ABSTRACT

A target acceleration/deceleration setting unit (28) of a vehicle acceleration/deceleration controller (16) sets a target acceleration or deceleration at a location at which a curve starts to be a predetermined maximum deceleration, sets a target acceleration or deceleration at a location at which the curve ends to be a predetermined maximum acceleration, sets a target acceleration or deceleration at a predetermined intermediate location between the location at which the curve starts and the location at which the curve ends to be zero, and sets a target deceleration D (Ld) at a location to which the travelling distance from the location at which the curve starts is Ld and a target acceleration A (La) at a (Continued)

location to which the travelling distance from the predetermined intermediate location is La to satisfy respective predetermined relations.

19 Claims, 6 Drawing Sheets

(51) Int. Cl.
*B60W 30/045* (2012.01)
*B60W 30/14* (2006.01)
*B60W 40/08* (2012.01)
*B60W 40/09* (2012.01)
*B60T 8/171* (2006.01)
*B60T 8/18* (2006.01)
*B60T 8/58* (2006.01)
*B60T 7/22* (2006.01)

(52) U.S. Cl.
CPC *B60T 8/18* (2013.01); *B60T 8/58* (2013.01); *B60W 30/045* (2013.01); *B60W 30/14* (2013.01); *B60W 40/08* (2013.01); *B60W 40/09* (2013.01); *B60T 2201/02* (2013.01); *B60T 2201/022* (2013.01); *B60T 2201/16* (2013.01); *B60T 2210/12* (2013.01); *B60T 2210/24* (2013.01); *B60T 2210/30* (2013.01); *B60T 2210/36* (2013.01); *B60T 2220/00* (2013.01); *B60T 2250/02* (2013.01)

(56) References Cited

U.S. PATENT DOCUMENTS

| | | | |
|---|---|---|---|
| 2009/0187322 A1* | 7/2009 | Yasui | B60W 10/06 701/70 |
| 2010/0082212 A1* | 4/2010 | Miyajima | B60K 31/0066 701/70 |
| 2011/0035131 A1* | 2/2011 | Yasui | B60W 30/146 701/93 |
| 2012/0179349 A1 | 7/2012 | Yamakado et al. | |
| 2012/0209489 A1 | 8/2012 | Saito et al. | |
| 2014/0032072 A1* | 1/2014 | Yoshihama | B60T 7/18 701/70 |
| 2014/0222309 A1 | 8/2014 | Yamakado et al. | |
| 2016/0054133 A1* | 2/2016 | Mizuno | G01C 21/20 701/400 |

FOREIGN PATENT DOCUMENTS

| | | |
|---|---|---|
| JP | 2011-098606 A | 5/2011 |
| JP | 2012-144160 A | 8/2012 |

OTHER PUBLICATIONS

International Search Report dated Feb. 2, 2016 in corresponding PCT Application No. PCT/JP2015/005527, 2 pp.

* cited by examiner

FIG.2

| MAJOR ITEM | MINOR ITEMS | CONDITIONS | FACTOR |
|---|---|---|---|
| OCCUPANT CONDITIONS | PHYSICAL CONDITION | GOOD | 1 |
| | | POOR | 0.8 |
| | DRIVING TENDENCY | QUICK | 1 |
| | | SLOW | 0.9 |
| DRIVING ENVIRONMENT | PERIOD | DAYTIME | 1 |
| | | NIGHTTIME | 0.8 |
| | VISIBILITY | HIGH | 1 |
| | | LOW | 0.9 |
| | TRAFFIC DENSITY | HIGH | 0.95 |
| | | LOW | 1 |
| | ROAD CONDITION | HIGH-$\mu$ | 1 |
| | | LOW-$\mu$ | 0.8 |
| VEHICLE CONDITIONS | VEHICLE SPEED | HIGH | 0.9 |
| | | LOW | 1 |
| | ACCELERATION | HIGH | 0.8 |
| | | LOW | 1 |
| | NUMBER OF OCCUPANTS | LARGE | 0.9 |
| | | SMALL | 1 |
| | WEIGHT OF LOAD | HIGH | 0.9 |
| | | LOW | 1 |

VEHICLE ACCELERATION AND DECELERATION CONTROL DEVICE

CROSS-REFERENCE TO RELATED APPLICATIONS

This is a U.S. National Stage Application of International Application No. PCT/JP2015/005527 filed on Nov. 4, 2015, which claims priority to Japanese Patent Application No. 2014-228058 filed on Nov. 10, 2014. The entire disclosure of this application is hereby incorporated by reference.

TECHNICAL FIELD

The present invention relates to a vehicle acceleration/deceleration controller that controls acceleration and deceleration of a vehicle in the direction of travel thereof from the entry of the vehicle into a curve to the exit of the vehicle from the curve.

BACKGROUND ART

A device has been conventionally known which controls acceleration and deceleration of a cornering vehicle to adjust the loads applied to front wheels of the vehicle functioning as steering wheels thereof so that a series of operations performed by a driver while the vehicle is travelling on a curve (braking, steering, acceleration, steering return, and other operations) are natural and stable. For example, Patent Document 1 discloses a vehicle dynamics controller. The vehicle dynamics controller controls acceleration and deceleration of a vehicle in the direction of travel thereof based on a lateral jerk applied to the vehicle in response to a steering operation performed while the vehicle is travelling on a curve, and determines the deceleration of the vehicle that is yet to enter the curve in consideration of the acceleration and deceleration of the vehicle travelling on the curve, thereby reducing the sense of strangeness felt by a driver.

CITATION LIST

Patent Document

PATENT DOCUMENT 1: Japanese Unexamined Patent Publication No. 2011-88576

SUMMARY OF THE INVENTION

Technical Problem

Unfortunately, the vehicle dynamics controller of Patent Document 1 merely controls acceleration and deceleration of a vehicle travelling on a curve in accordance with the lateral jerk applied to the vehicle in response to the steering operation, and merely determines the deceleration of the vehicle that is yet to enter the curve in consideration of the acceleration and deceleration of the vehicle travelling on the curve. The vehicle dynamics controller does not reflect the relation between the magnitude of the lateral acceleration applied to the vehicle travelling on the curve and the magnitudes of the accelerations and decelerations of the vehicle in the direction of travel thereof from the entry of the vehicle into the curve to the exit of the vehicle from the curve. Thus, in Patent Document 1, in the course of travel of the vehicle from the entry of the vehicle into the curve to the exit of the vehicle from the curve, the direction and magnitude of an inertial force acting on the vehicle and an occupant abruptly vary. This may reduce occupant comfort, or may cause the occupant to feel strange.

To address this problem, a target deceleration at a location at which a curve starts, for example, may be set to have a magnitude equal to that of a maximum lateral acceleration that may be applied to a cornering vehicle, a target deceleration in the direction of travel of the vehicle at the location at which the radius of curvature of the curve is smallest may be set to be zero, and a target deceleration in the direction of travel of the vehicle between the location at which the curve starts and the location at which the radius of curvature of the curve is smallest may be set such that the magnitude of a resultant acceleration of the deceleration of the cornering vehicle in the direction of travel thereof and the lateral acceleration thereof is maintained at the magnitude of the maximum lateral acceleration that may be applied to the cornering vehicle. This allows the magnitude of the deceleration felt by an occupant at the point in time when the vehicle enters the curve to be equal to the magnitude of the maximum lateral acceleration felt by the occupant during the travel of the vehicle on the curve, and allows the magnitude of the acceleration felt by the occupant from the point in time when the vehicle enters the curve to the point in time when the vehicle leaves the curve to be kept constant. Thus, the magnitude of an inertial force acting on the vehicle or the occupant may be kept constant, thereby improving occupant comfort and reducing the sense of strangeness felt by the occupant.

However, if, as described above, the target deceleration in the direction of travel of the vehicle is set such that the magnitude of the resultant acceleration of the deceleration of the cornering vehicle in the direction of travel thereof and the lateral acceleration thereof is maintained at the magnitude of the maximum lateral acceleration that may be applied to the cornering vehicle, the occupant (in particular, a driver) may feel as if the vehicle is travelling on the curve at or near the limit of tire performance. Thus, the occupant may feel insecure depending on the occupant's physical condition, vehicle conditions such as the number of occupants, the driving environment such as weather, and other factors.

In view of the foregoing background, it is therefore an object of the present invention to provide a vehicle acceleration/deceleration controller that may improve comfort of an occupant in a vehicle and reduce the sense of strangeness felt by the occupant while offering a sense of safety to the occupant in the vehicle, in the course of travel of the vehicle from the entry of the vehicle into a curve to the exit of the vehicle from the curve.

Solution to the Problem

To achieve the object, the present invention is directed to a vehicle acceleration/deceleration controller that controls an acceleration and deceleration of a vehicle in a direction of travel of the vehicle from entry of the vehicle into a curve to exit of the vehicle from the curve. The vehicle acceleration/deceleration controller includes: a curve shape information obtaining unit configured to obtain shape information including a radius of curvature of the curve in front of the vehicle; a target acceleration/deceleration setting unit configured to set target accelerations and decelerations of the vehicle in the direction of travel of the vehicle between a location at which the curve starts and a location at which the curve ends; and an acceleration/deceleration control unit configured to, when the vehicle travels from the location at which the curve starts to the location at which the curve ends, control the acceleration and deceleration of the vehicle in the direction of travel of the vehicle in accordance with the target accelerations and decelerations set by the target acceleration/deceleration setting unit. The target acceleration/deceleration setting unit sets one of the target accelerations and decelerations at the location at which the curve starts to be a predetermined maximum deceleration, sets another one of the target accelerations and decelerations at the location at which the curve ends to be a predetermined maximum acceleration, sets still another one of the target accelerations and decelerations at a predetermined intermediate location between the location at which the curve starts and the location at which the curve ends to be zero, sets a target deceleration D (Ld) at a location to which a travelling distance from the location at which the curve starts is Ld between the location at which the curve starts and the predetermined intermediate location to satisfy the following expression:

$$D\max \cdot (1 - Ld/L1) \leq D(Ld) \leq D\max \cdot \cos(\pi Ld/2L1) \quad (1)$$

where Dmax represents the predetermined maximum deceleration, and L1 represents a travelling distance between the location at which the curve starts and the predetermined intermediate location, and sets a target acceleration A (La) at a location to which a travelling distance from the predetermined intermediate location is La between the predetermined intermediate location and the location at which the curve ends to satisfy the following expression:

$$A\max \cdot La/L2 \leq A(La) \leq A\max \cdot \sin(\pi La/2L2) \quad (2)$$

where Amax represents the predetermined maximum acceleration, and L2 represents a travelling distance between the predetermined intermediate location and the location at which the curve ends.

According to this configuration, the target deceleration D (Ld) at the location to which the travelling distance from the location at which the curve starts is Ld between the location at which the curve starts and the predetermined intermediate location at which the target acceleration/deceleration is set to be zero is set to satisfy the expression (1), and sets the target acceleration A (La) at the location to which the travelling distance from the predetermined intermediate location is La between the predetermined intermediate location and the location at which the curve ends is set to satisfy the expression (2). Thus, the direction and magnitude of an acceleration or deceleration felt by the occupant while the vehicle is travelling from the location at which the curve starts to the location at which the curve ends may be smoothly changed to make it difficult for the occupant to feel insecure. This may improve the occupant comfort and reduce the sense of strangeness felt by the occupant while offering a sense of safety to the occupant in the course of the travel of the vehicle from the entry of the vehicle into the curve to the exit of the vehicle from the curve.

In one embodiment of the vehicle acceleration/deceleration controller, the predetermined intermediate location at which the target acceleration/deceleration setting unit sets the target acceleration and deceleration to be zero may be a location at which the radius of curvature of the curve is smallest.

Thus, the vehicle does not decelerate excessively or insufficiently, and the occupant may be caused to feel that the vehicle is cornering smoothly with the tire performance efficiently utilized, thereby further improving the occupant comfort.

In another embodiment of the vehicle acceleration/deceleration controller, the predetermined intermediate location at which the target acceleration/deceleration setting unit sets the target acceleration and deceleration to be zero may be a location between the location at which the curve starts and a location at which the radius of curvature of the curve is smallest.

Thus, a sense of safety may be offered to the occupant, who may feel that the vehicle is cornering after decelerating sufficiently.

In still another embodiment of the vehicle acceleration/deceleration controller, the predetermined intermediate location at which the target acceleration/deceleration setting unit sets the target acceleration and deceleration to be zero may be a location between the location at which the curve ends and a location at which the radius of curvature of the curve is smallest.

Thus, decreasing the lateral acceleration of the vehicle may be started while the vehicle is decelerating. This may offer a sense of safety to the occupant, who may feel that the vehicle is cornering well within the tire performance.

In the vehicle acceleration/deceleration controller, the predetermined maximum deceleration set as the one of the target accelerations and decelerations at the location at which the curve starts by the target acceleration/deceleration setting unit is beneficially a deceleration having a magnitude equal to that of a maximum lateral acceleration that may be applied to the vehicle during cornering.

This allows the magnitude of a deceleration felt by the occupant at the point in time when the vehicle enters the curve to agree with the magnitude of a maximum lateral acceleration felt by the occupant while the vehicle is travelling on the curve, and allows the direction and magnitude of an acceleration felt by the occupant while the vehicle is travelling on the curve to be smoothly changed. Thus, in the course of travel of the vehicle from the entry of the vehicle into the curve to the exit of the vehicle from the curve, the direction and magnitude of an inertial force acting on the vehicle and the occupant may be smoothly changed, thereby improving the occupant comfort and reducing the sense of strangeness felt by the occupant.

Beneficially, the vehicle acceleration/deceleration controller further includes an occupant condition obtaining unit configured to obtain a condition of an occupant in the vehicle. It is recommended that the target acceleration/deceleration setting unit set the target deceleration D (Ld) within a range satisfying the expression (1) in accordance with the condition of the occupant in the vehicle obtained by the occupant condition obtaining unit, and set the target acceleration A (La) within a range satisfying the expression (2) in accordance with the condition of the occupant in the vehicle obtained by the occupant condition obtaining unit.

According to this configuration, the direction and magnitude of an acceleration or deceleration felt by the occupant while the vehicle is travelling from the location at which the curve starts to the location at which the curve ends may be more smoothly changed in accordance with the condition of the occupant, or may be changed to make it more difficult for the occupant to feel insecure.

In the vehicle acceleration/deceleration controller including the occupant condition obtaining unit, the occupant condition obtaining unit may be configured to obtain information for determining whether or not the occupant is in good physical condition to be the condition of the occupant in the vehicle and determine whether or not the occupant is in good physical condition, based on the obtained information, and the target acceleration/deceleration setting unit may be configured to, if the occupant condition obtaining unit determines that the occupant is in good physical condition, set the target deceleration D (Ld) and the target acceleration A (La) to be closer to Dmax·cos($\pi$Ld/2L1) and Amax·sin($\pi$La/2L2), respectively, than if the occupant condition obtaining unit determines that the occupant is not in good physical condition.

As a result, if the occupant is in good physical condition, and while the vehicle is travelling on the curve, the occupant is thus less likely to feel insecure, the acceleration or deceleration of the vehicle may be changed to allow the occupant to feel that the vehicle is cornering smoothly with the tire performance more efficiently utilized. On the other hand, if the occupant is not in good physical condition, and while the vehicle is travelling on the curve, the occupant is thus more likely to feel insecure, the acceleration or deceleration of the vehicle may be changed to make it more difficult for the occupant to feel insecure.

In the vehicle acceleration/deceleration controller including the occupant condition obtaining unit, the occupant condition obtaining unit may be configured to obtain information for determining whether or not the occupant tends to perform quick operations to be the condition of the occupant in the vehicle and determine whether or not the occupant tends to perform quick operations, based on the obtained information, and the target acceleration/deceleration setting unit may be configured to, if the occupant condition obtaining unit determines that the occupant tends to perform quick operations, set the target deceleration D (Ld) and the target acceleration A (La) to be closer to Dmax·cos($\pi$Ld/2L1) and Amax·sin($\pi$La/2L2), respectively, than if the occupant condition obtaining unit determines that the occupant does not tend to perform quick operations.

As a result, if the occupant (driver) tends to perform quick operations, and while the vehicle is travelling on the curve, the occupant is thus less likely to feel insecure, the acceleration or deceleration of the vehicle may be changed to allow the occupant to feel that the vehicle is cornering smoothly with the tire performance more efficiently utilized. On the other hand, if the occupant does not tend to perform quick operations, and while the vehicle is travelling on the curve, the occupant is thus more likely to feel insecure, the acceleration or deceleration of the vehicle may be changed to make it more difficult for the occupant to feel insecure. Thus, the acceleration or deceleration may be changed to adapt to the occupant's driving tendency.

Beneficially, the vehicle acceleration/deceleration controller further includes a storage unit configured to store accelerations applied to the vehicle by driving operations of the occupant. It is recommended that the occupant condition obtaining unit be configured to obtain information on the accelerations applied to the vehicle by the occupant's past driving operations stored in the storage unit and determine whether or not the occupant tends to perform quick operations, based on the obtained information on the accelerations.

This allows the occupant's (driver's) driving tendency to be appropriately determined based on the information on the accelerations applied to the vehicle by the occupant's past operations.

Beneficially, the vehicle acceleration/deceleration controller further includes a vehicle condition obtaining unit configured to obtain a condition of the vehicle. It is recommended that the target acceleration/deceleration setting unit set the target deceleration D (Ld) within a range satisfying the expression (1) in accordance with the condition of the vehicle obtained by the vehicle condition obtaining unit, and set the target acceleration A (La) within a range satisfying the expression (2) in accordance with the condition of the vehicle obtained by the vehicle condition obtaining unit.

According to this configuration, the direction and magnitude of an acceleration or deceleration felt by the occupant while the vehicle is travelling from the location at which the curve starts to the location at which the curve ends may be more smoothly changed in accordance with the vehicle conditions, or may be changed to make it more difficult for the occupant to feel insecure.

In the vehicle acceleration/deceleration controller including the vehicle condition obtaining unit, the vehicle condition obtaining unit may be configured to obtain a speed of the vehicle as the condition of the vehicle, and the target acceleration/deceleration setting unit may be configured to set the target deceleration D (Ld) and the target acceleration A (La) such that the lower the speed obtained by the vehicle condition obtaining unit is, the closer to Dmax·cos($\pi$Ld/2L1) the target deceleration D (Ld) is, and the closer to Amax·sin($\pi$La/2L2) the target acceleration A (La) is.

As a result, if the speed of the vehicle is low, and the occupant is thus less likely to feel insecure, the acceleration or deceleration of the vehicle may be changed to allow the occupant to feel that the vehicle is cornering smoothly with the tire performance more efficiently utilized. On the other hand, if the speed of the vehicle is high, and the occupant is thus more likely to feel insecure, the acceleration or deceleration of the vehicle may be changed to make it more difficult for the occupant to feel insecure.

In the vehicle acceleration/deceleration controller including the vehicle condition obtaining unit, the vehicle condition obtaining unit may be configured to obtain the number of occupants riding in the vehicle as the condition of the vehicle, and the target acceleration/deceleration setting unit may set the target deceleration D (Ld) and the target acceleration A (La) such that the smaller the number of the occupants obtained by the vehicle condition obtaining unit is, the closer to Dmax·cos($\pi$Ld/2L1) the target deceleration D (Ld) is, and the closer to Amax·sin($\pi$La/2L2) the target acceleration A (La) is.

As a result, if the weight of the vehicle is low due to the fact that the number of the occupants is small, and while the vehicle is travelling on the curve, the occupant is thus less likely to feel insecure, the acceleration or deceleration of the vehicle may be changed to allow the occupant to feel that the vehicle is cornering smoothly with the tire performance more efficiently utilized. On the other hand, if the weight of the vehicle is high due to the fact that the number of the occupants is large, and while the vehicle is travelling on the curve, the occupant is thus more likely to feel insecure, the acceleration or deceleration of the vehicle may be changed to make it more difficult for the occupant to feel insecure.

In the vehicle acceleration/deceleration controller including the vehicle condition obtaining unit, the vehicle condition obtaining unit may be configured to obtain a weight of a load carried by the vehicle as the condition of the vehicle, and the target acceleration/deceleration setting unit may be configured to set the target deceleration D (Ld) and the target acceleration A (La) such that the lower the weight of the load obtained by the vehicle condition obtaining unit is, the closer to Dmax·cos($\pi$Ld/2L1) the target deceleration D (Ld) is, and the closer to Amax·sin($\pi$La/2L2) the target acceleration A (La) is.

As a result, if the weight of the vehicle is low due to the fact that the weight of the load is low, and while the vehicle is travelling on the curve, the occupant is thus less likely to feel insecure, the acceleration or deceleration of the vehicle may be changed to allow the occupant to feel that the vehicle is cornering smoothly with the tire performance more efficiently utilized. On the other hand, if the weight of the vehicle is high due to the fact that the weight of the load is high, and while the vehicle is travelling on the curve, the occupant is thus more likely to feel insecure, the acceleration or deceleration of the vehicle may be changed to make it more difficult for the occupant to feel insecure.

Beneficially, the vehicle acceleration/deceleration controller further includes a driving environment obtaining unit configured to obtain a driving environment of the vehicle. It is recommended that the target acceleration/deceleration setting unit be configured to set the target deceleration D (Ld) within a range satisfying the expression (1) in accordance with the driving environment of the vehicle obtained by the driving environment obtaining unit, and set the target acceleration A (La) within a range satisfying the expression (2) in accordance with the driving environment of the vehicle obtained by the driving environment obtaining unit.

According to this configuration, the direction and magnitude of an acceleration or deceleration felt by the occupant while the vehicle is travelling from the location at which the curve starts to the location at which the curve ends may be more smoothly changed in accordance with the driving environment of the vehicle, or may be changed to make it more difficult for the occupant to feel insecure.

In the vehicle acceleration/deceleration controller including the driving environment obtaining unit, the driving environment obtaining unit may be configured to obtain information for determining whether or not a period when the vehicle travels on the curve is during a daytime to be the driving environment of the vehicle, and determine whether or not the period is during the daytime, based on the obtained information, and the target acceleration/deceleration setting unit may be configured to, if the driving environment obtaining unit determines that the period is during the daytime, set the target deceleration D (Ld) and the target acceleration A (La) to be closer to Dmax·cos($\pi$Ld/2L1) and Amax·sin($\pi$La/2L2), respectively, than if the driving environment obtaining unit determines that the period is not during the daytime.

As a result, if the vehicle travels during the daytime when it is bright outside the vehicle, and the occupant is thus less likely to feel insecure, the acceleration or deceleration of the vehicle may be changed to allow the occupant to feel that the vehicle is cornering smoothly with the tire performance more efficiently utilized. On the other hand, if the vehicle travels during the nighttime when it is dark outside the vehicle, and the occupant is thus more likely to feel insecure, the acceleration or deceleration of the vehicle may be changed to make it more difficult for the occupant to feel insecure.

In the vehicle acceleration/deceleration controller including the driving environment obtaining unit, the driving environment obtaining unit may be configured to obtain information for determining whether or not the curve has high visibility to be the driving environment of the vehicle, and determine whether or not the curve has high visibility, based on the obtained information, and the target acceleration/deceleration setting unit may be configured to, if the driving environment obtaining unit determines that the curve has high visibility, set the target deceleration D (Ld) and the target acceleration A (La) to be closer to Dmax·cos($\pi$Ld/2L1) and Amax·sin($\pi$La/2L2), respectively, than if the curve does not have high visibility.

As a result, if the curve has high visibility, and while the vehicle is travelling on the curve, the occupant is thus less likely to feel insecure, the acceleration or deceleration of the vehicle may be changed to allow the occupant to feel that the vehicle is cornering smoothly with the tire performance more efficiently utilized. On the other hand, if the curve has low visibility, and while the vehicle is travelling on the curve, the occupant is thus more likely to feel insecure, the acceleration or deceleration of the vehicle may be changed to make it more difficult for the occupant to feel insecure.

In the vehicle acceleration/deceleration controller including the driving environment obtaining unit, the driving environment obtaining unit may be configured to obtain information for determining whether or not a traffic density of the curve is high to be the driving environment of the vehicle, and determine whether or not the traffic density of the curve is high, based on the obtained information, and the target acceleration/deceleration setting unit may be configured to, if the driving environment obtaining unit determines that the traffic density of the curve is not high, set the target deceleration D (Ld) and the target acceleration A (La) to be closer to Dmax·cos($\pi$Ld/2L1) and Amax·sin($\pi$La/2L2), respectively, than if the driving environment obtaining unit determines that the traffic density is high.

As a result, if the traffic density of the curve is low, and while the vehicle is travelling on the curve, the occupant is thus less likely to feel insecure, the acceleration or deceleration of the vehicle may be changed to allow the occupant to feel that the vehicle is cornering smoothly with the tire performance more efficiently utilized. On the other hand, if the traffic density of the curve is high, and while the vehicle is travelling on the curve, the occupant is thus more likely to feel insecure, the acceleration or deceleration of the vehicle may be changed to make it more difficult for the occupant to feel insecure.

In the vehicle acceleration/deceleration controller including the driving environment obtaining unit, the driving environment obtaining unit may be configured to obtain information for determining a condition of a road surface of the curve to be the driving environment of the vehicle, and determine whether or not the road surface of the curve has a high friction coefficient, based on the obtained information, and the target acceleration/deceleration setting unit may be configured to, if the driving environment obtaining unit determines that the road surface of the curve has a high friction coefficient, set the target deceleration D (Ld) and the target acceleration A (La) to be closer to Dmax·cos($\pi$Ld/2L1) and Amax·sin($\pi$La/2L2), respectively, than if the driving environment obtaining unit determines that the road surface of the curve does not have a high friction coefficient.

As a result, if the road surface of the curve has a high friction coefficient, and while the vehicle is travelling on the curve, the occupant is thus less likely to feel insecure, the acceleration or deceleration of the vehicle may be changed to allow the occupant to feel that the vehicle is cornering smoothly with the tire performance more efficiently utilized. On the other hand, if the road surface of the curve has a low friction coefficient, and while the vehicle is travelling on the curve, the occupant is thus more likely to feel insecure, the acceleration or deceleration of the vehicle may be changed to make it more difficult for the occupant to feel insecure.

Advantages of the Invention

As can be seen from the foregoing description, a vehicle acceleration/deceleration controller according to the present invention may improve occupant comfort and reduce the sense of strangeness felt by an occupant while offering a sense of safety to the occupant in the course of travel of a vehicle from the entry of the vehicle into a curve to the exit of the vehicle from the curve.

BRIEF DESCRIPTION OF THE DRAWINGS

FIG. 2 is a table showing exemplary information stored in an acceleration/deceleration correction factor map of the vehicle acceleration/deceleration controller according to the first embodiment.

DESCRIPTION OF EMBODIMENTS

Embodiments of the present invention will now be described in detail with reference to the drawings.

First Embodiment

Figure 1:
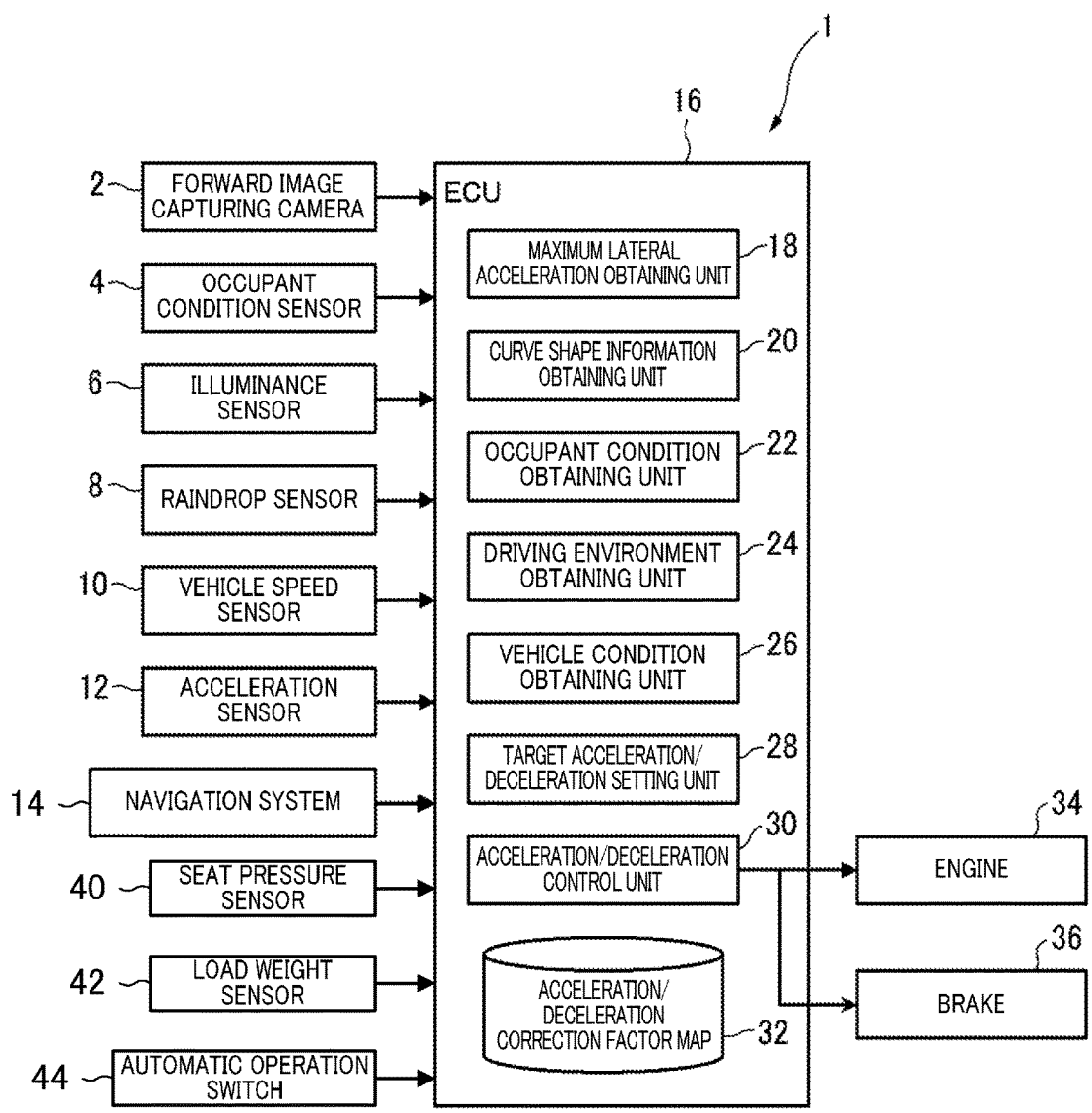
FIG. 1 is a block diagram showing a configuration for a control system of a vehicle including a vehicle acceleration/deceleration controller according to a first embodiment of the present invention.

FIG. 1 shows a configuration for a control system of a vehicle 1 including a vehicle acceleration/deceleration controller according to a first embodiment of the present invention. The vehicle 1 includes a forward image capturing camera 2 that captures an image in front of the vehicle 1, an occupant condition sensor 4 that detects the conditions of an occupant (in particular, a driver) in the cabin of the vehicle 1, an illuminance sensor 6 that detects the daylight illuminance on the vehicle 1, a raindrop sensor 8 that detects raindrops adhering to the windshield of the vehicle 1, a vehicle speed sensor 10 that detects the speed of the vehicle 1, an acceleration sensor 12 that detects the acceleration of the vehicle 1 in the direction of travel thereof, a navigation system 14, seat pressure sensors 40 each arranged on a seating surface of a seat cushion of an associated one of seats of the vehicle 1 to detect whether or not an occupant is seated on the seat, a load weight sensor 42 that detects the weight of a load placed on the vehicle 1, and an automatic operation switch 44 operated by the occupant. Data on the image in front of the vehicle 1 captured by the forward image capturing camera 2, map data and positional data of the vehicle 1 acquired by the navigation system 14, data detected by the sensors, and information on whether the automatic operation switch 44 is on or off are output to an electronic control unit (ECU) 16 serving as the vehicle acceleration/deceleration controller.

The ECU 16 receives the data on the image captured by the forward image capturing camera 2, the map data and the positional data of the vehicle 1 acquired by the navigation system 14, the data detected by the sensors, and the data on whether the automatic operation switch 44 is on or off. Then, when the vehicle 1 travels on a target curve for which target accelerations and decelerations described below are set, an engine 34 and a brake 36 of the vehicle 1 are controlled as described below, based on the received items of information. The engine 34 is a petrol engine, a diesel engine, or any other suitable engine.

The ECU 16 includes a maximum lateral acceleration obtaining unit 18 that obtains a maximum lateral acceleration that may be applied to the cornering vehicle 1, a curve shape information obtaining unit 20 that obtains curve shape information including the radius of curvature of a curve in front of the vehicle 1, an occupant condition obtaining unit 22 that obtains information on the conditions of an occupant (as used herein, a driver) of the vehicle 1, a driving environment obtaining unit 24 that obtains information on a driving environment of the vehicle 1, a vehicle condition obtaining unit 26 that obtains information on the conditions of the vehicle 1, a target acceleration/deceleration setting unit 28 that sets target accelerations and decelerations (particularly, an acceleration/deceleration control curve described below) in the direction of travel of the vehicle 1 from the entry of the vehicle 1 into the curve to the exit of the vehicle 1 from the curve, an acceleration/deceleration control unit 30 that controls the acceleration or deceleration of the vehicle 1 in the direction of travel thereof in accordance with the target accelerations and decelerations set by the target acceleration/deceleration setting unit 28, and an acceleration/deceleration correction factor map 32 that is referred to when the target acceleration/deceleration setting unit 28 sets the target accelerations and decelerations.

The maximum lateral acceleration obtaining unit 18, the curve shape information obtaining unit 20, the occupant condition obtaining unit 22, the driving environment obtaining unit 24, the vehicle condition obtaining unit 26, the target acceleration/deceleration setting unit 28, the acceleration/deceleration control unit 30, and the acceleration/deceleration correction factor map 32 are configured as a computer, which includes a central processing unit (CPU), various programs executed on the CPU (including a basic control program such as an operating system (OS), and application programs that are launched by the OS to implement specific functions), and a memory such as a read-only memory (ROM) or random-access memory (RAM) for storing programs and various data.

The acceleration/deceleration correction factor map 32 is a map storing correction factors for correcting the acceleration/deceleration control curve described below in accordance with the conditions of the occupant (the driver) in the vehicle 1 (hereinafter referred to as "occupant conditions"), the driving environment of the vehicle 1 (hereinafter referred to as "driving environment"), and the conditions of the vehicle 1 (hereinafter referred to as "vehicle conditions"). As exemplified in FIG. 2, data on the occupant conditions include items of data on the occupant's physical condition and the occupant's driving tendency. Data on the driving environment include items of data on a period when the vehicle 1 travels on the target curve for which the target accelerations and decelerations are set, the visibility of the curve, the traffic density of the curve, and the road condition of the curve (the condition of the road surface of the curve). Data on the vehicle conditions include items of data on the speed of the vehicle 1, the acceleration of the vehicle 1, the number of occupants riding in the vehicle 1, and the weight of the load carried by the vehicle 1. The acceleration/deceleration correction factor map 32 stores a factor of one or less for each of the items. The specific contents of information stored in the acceleration/deceleration correction factor map 32 will be described below.

Next, how the ECU 16 controls the acceleration and deceleration of the vehicle 1 in the direction of travel thereof will be described with reference to FIGS. 3-5.

Figure 3:
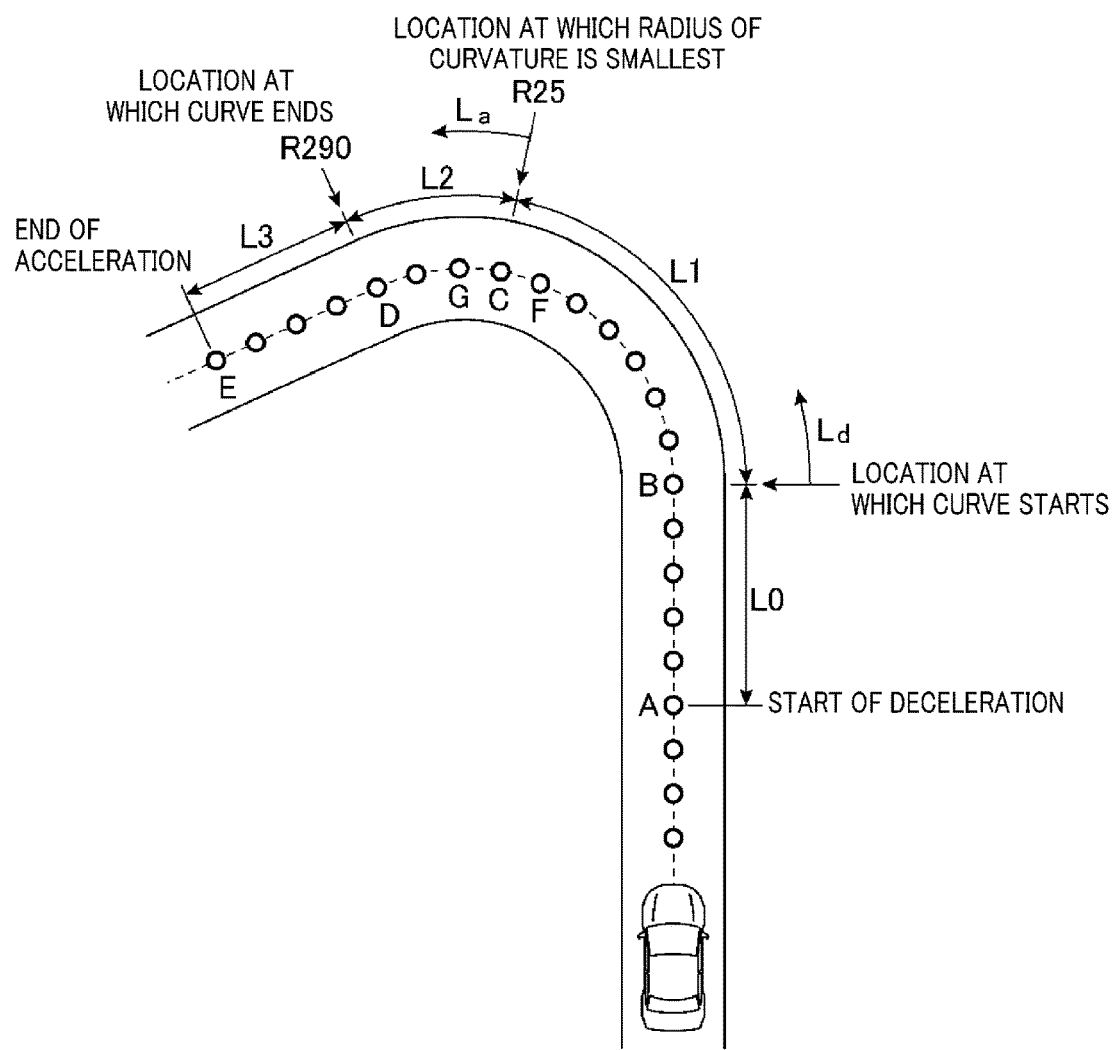
FIG. 3 is a plan view showing an exemplary curve on which a vehicle including the vehicle acceleration/deceleration controller according to the first embodiment travels.

FIG. 3 is a plan view showing an exemplary curve on which the vehicle 1 travels. FIG. 4 is a flow chart of an acceleration/deceleration control process performed by the ECU 16. FIG. 5 is a diagram showing an acceleration/deceleration control curve set by the ECU 16.

In this embodiment, a situation where the ECU 16 controls the acceleration/deceleration of the vehicle 1 in the direction of travel thereof from the entry of the vehicle 1 into a left curve to the exit of the vehicle 1 from the left curve as shown in FIG. 3 will be described as an example. The broken line shown in FIG. 3 indicates the centerline of a lane in which the vehicle 1 travels. This centerline is formed by combining together a clothoid curve, a segment of a circle, a parabola, and other curves, for example.

Figure 4:
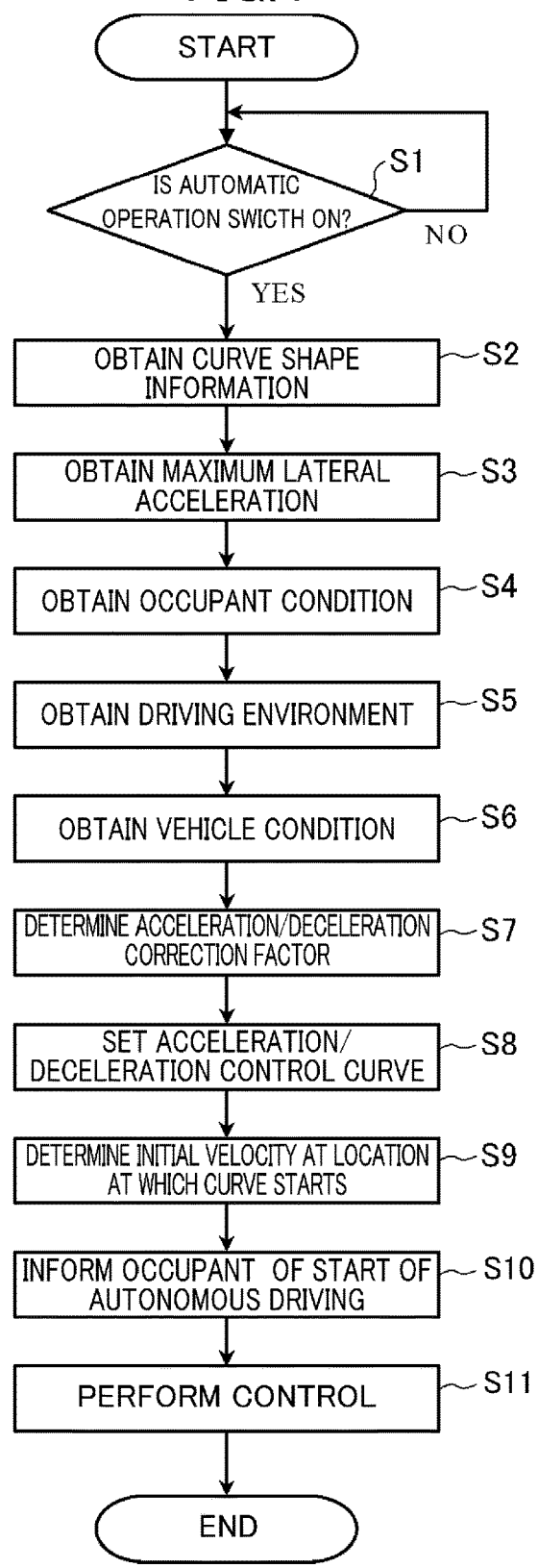
FIG. 4 is a flow chart of an acceleration/deceleration control process performed by the vehicle acceleration/deceleration controller according to the first embodiment.

The acceleration/deceleration control process shown in FIG. 4 is a process for setting the acceleration/deceleration control curve between the location at which a curve starts and the location at which the curve ends to control the acceleration and deceleration of the vehicle 1 based on the acceleration/deceleration control curve. This process is performed after an ignition switch (not shown) of the vehicle 1 is turned on.

As shown in FIG. 4, after the acceleration/deceleration control process is started, the ECU 16 waits until the automatic operation switch 44 operated by the occupant is turned on in Step S1. Note that if the occupant wishes to have the vehicle automatically driven by the ECU 16 (as used herein, to have the acceleration and deceleration of the vehicle 1 on the curve automatically controlled), he or she turns on the automatic operation switch 44.

If the automatic operation switch 44 is turned on, the process proceeds to Step S2, in which the curve shape information obtaining unit 20 obtains shape information including the radius of curvature of the curve.

For example, the curve shape information obtaining unit 20 identifies a curve having a radius of curvature R of less than or equal to 300 m in the travelling path of the vehicle 1 as a target curve for which the acceleration/deceleration control curve is set, based on the current location of the vehicle 1, map data on its surroundings, and other data. These data are obtained by the navigation system 14. Then, the radius of curvature at each of nodes (described below) of the identified curve is obtained based on the map data. Alternatively, the curve shape information obtaining unit 20 may determine the radius of curvature R of a portion of a road in front of the vehicle 1, based on the data on the image in front of the vehicle 1 captured by the forward image capturing camera 2, and if the radius of curvature R is less than or equal to 300 m, may identify the portion of the road (curve) as the target curve for which the acceleration/deceleration control curve is set. Then, the nodes (indicated by the white circles shown in FIG. 3) are set on the centerline of the identified curve at regular intervals (for example, intervals of 5 m), based on the data on the image in front of the vehicle 1 captured by the forward image capturing camera 2. The radius of curvature at each node is thus obtained.

Next, in Step S3, the maximum lateral acceleration obtaining unit 18 obtains a maximum lateral acceleration Glmax that may be applied to the vehicle 1 during cornering. Specifically, the maximum lateral acceleration obtaining unit 18 obtains, as the maximum lateral acceleration Glmax, a maximum lateral acceleration (e.g., 4 m/s$^2$) that may be applied to the vehicle 1 during cornering at a constant speed in a linear region of friction characteristics of tires.

For example, cornering forces Cf, Cr respectively applied to front and rear tires fitted on the vehicle 1 are respectively expressed by the following expressions:

$$Cf=-eKf\beta f$$

$$Cr=-2Kr-\beta r$$

where βf and βr represent the slip angles of the front and rear tires, respectively, eKf represents the equivalent cornering power of the front tire, and Kr represents the cornering power of the rear tire. Maximum cornering forces Cfmax, Crmax respectively applied to the front and rear tires may be obtained by substituting, in these expressions, maximum values (e.g., eight degrees) of the slip angles βf, βr in the linear region of the friction characteristics of the front and rear tires. Then, the maximum lateral acceleration Glmax may be calculated by the following expression based on the equation of motion of the vehicle 1:

$$Glmax=(Cfmax+Crmax)/m$$

where m represents the mass of the vehicle 1. This maximum lateral acceleration Glmax may be calculated by the maximum lateral acceleration obtaining unit 18 in the manner described above. Alternatively, the maximum lateral acceleration Glmax may be previously stored in the memory of the ECU 16, and the maximum lateral acceleration obtaining unit 18 may receive the maximum lateral acceleration Glmax from the memory as necessary.

Next, in Step S4, the occupant condition obtaining unit 22 obtains the occupant conditions from the occupant condition sensor 4. Examples of the occupant condition sensor 4 include a blink detection camera for detecting the occupant's blink, and an infrared sensor for detecting the occupant's body surface temperature or pulse wave. The occupant condition obtaining unit 22 obtains information for determining whether or not the occupant is in good physical condition to be the occupant conditions, from the occupant condition sensor 4, and determines whether or not the occupant is in good physical condition, based on the obtained information. The occupant condition obtaining unit 22 obtains information on the occupant's body surface temperature, for example, as information for determining whether or not the occupant is in good physical condition, from the occupant condition sensor 4. If the obtained body surface temperature is within a predetermined range, a determination is made that the occupant is in good physical condition. On the other hand, if the obtained body surface temperature is outside the predetermined range, a determination is made that the occupant is in poor physical condition.

The occupant condition obtaining unit 22 obtains, as the occupant conditions, information for determining whether or not the occupant tends to perform quick operations, and determines whether or not the occupant tends to perform quick operations, based on the information thus obtained. For example, if the occupant has performed driving operations of the vehicle 1, longitudinal and lateral accelerations applied to the vehicle 1 by the operations have been stored in the memory (storage unit) of the ECU 16. Then, the occupant condition obtaining unit 22 obtains, from the memory, information on the longitudinal and lateral accelerations applied to the vehicle 1 by the occupant's past operations and stored in the memory, and determines whether or not the occupant tends to perform quick operations, based on the obtained information on the longitudinal and lateral accelerations. For example, if both or one of the average of the longitudinal accelerations thus obtained and the average of the lateral accelerations thus obtained are/is greater than or equal to a predetermined threshold, the occupant condition obtaining unit 22 determines that the occupant tends to perform quick operations. Otherwise, the occupant condition obtaining unit 22 determines that the occupant tends to perform slow operations.

Next, in Step S5, the driving environment obtaining unit 24 obtains information on the driving environment on a target curve for which the acceleration/deceleration control curve (the target acceleration/deceleration) is set. The driving environment includes the period when the vehicle 1 travels on the curve, the visibility of the curve, the traffic density of the curve, and the road condition of the curve.

Specifically, the driving environment obtaining unit 24 obtains information for determining whether or not the period when the vehicle 1 travels on the curve is during the daytime (information on daylight illuminance) to be the driving environment, from the illuminance sensor 6, and determines whether or not the period is during the daytime, based on the information thus obtained. Specifically, if the daylight illuminance detected by the illuminance sensor 6 is greater than or equal to a predetermined threshold, the driving environment obtaining unit 24 determines that the period is during the daytime. If the daylight illuminance is less than the predetermined threshold, the driving environment obtaining unit 24 determines that the period is during the nighttime.

The driving environment obtaining unit 24 further obtains information for determining whether or not the target curve for which the acceleration/deceleration control curve is set is visible (the map data of the navigation system 14 or the data on the image in front of the vehicle 1) to be the driving environment, from the navigation system 14 or the forward image capturing camera 2, and determines whether or not the curve has high visibility, based on the information thus obtained. If the presence of an obstacle, such as a building, on the line connecting together the location at which the curve starts and the location at which the curve ends, for example, may cause the location at which the curve ends to be invisible from the location at which the curve starts, the driving environment obtaining unit 24 determines that the curve has low visibility. If the absence of an obstacle, such as a building, on the line may allow the location at which the curve ends to be visible from the location at which the curve starts, the driving environment obtaining unit 24 determines that the curve has high visibility.

The driving environment obtaining unit 24 further obtains information for determining whether or not the traffic density of the curve is high (traffic information obtained by the navigation system 14 or the data on the image in front of the vehicle 1) to be the driving environment, from the navigation system 14 or the forward image capturing camera 2, and determines whether or not the traffic density of the curve is high, based on the information thus obtained. For example, if the driving environment obtaining unit 24 obtains, from the navigation system 14, traffic information that traffic is backed up on the curve, or if a predetermined or greater number of preceding vehicles on the curve are detected from the data on the image in front of the vehicle 1 captured by the forward image capturing camera 2, the driving environment obtaining unit 24 determines that the traffic density of the curve is high. If the driving environment obtaining unit 24 obtains, from the navigation system 14, traffic information that traffic is not backed up on the curve, or if a predetermined or greater number of preceding vehicles on the curve are not detected from the data on the image in front of the vehicle 1 captured by the forward image capturing camera 2, the driving environment obtaining unit 24 determines that the traffic density of the curve is low.

The driving environment obtaining unit 24 further obtains information for determining the road condition of the curve (information on the presence or absence of raindrops) to be the driving environment, from the raindrop sensor 8, and determines whether or not the surface of the curve has a high friction coefficient, based on the information thus obtained. For example, if the driving environment obtaining unit 24 obtains information that there is no raindrop from the raindrop sensor 8, the driving environment obtaining unit 24 determines that the surface of the curve has a high friction coefficient, i.e., the curve has a high-μ surface. If the driving environment obtaining unit 24 obtains information that there are raindrops from the raindrop sensor 8, the driving environment obtaining unit 24 determines that the surface of the curve has a low friction coefficient, i.e., the curve has a low-μ surface.

Next, in Step S6, the vehicle condition obtaining unit 26 obtains the speed of the vehicle 1 and the acceleration thereof in the direction of travel thereof, as the vehicle conditions, from the vehicle speed sensor 10 and the acceleration sensor 12, respectively. The vehicle condition obtaining unit 26 further obtains the number of occupants riding in the vehicle 1 and the weight of the load carried by the vehicle 1, as the vehicle conditions, from the seat pressure sensor 40 and the load weight sensor 42, respectively.

If the speed obtained from the vehicle speed sensor 10 is higher than or equal to a predetermined speed, the vehicle condition obtaining unit 26 determines that the speed is high. If the speed is lower than the predetermined speed, the vehicle condition obtaining unit 26 determines that the speed is low.

If the acceleration obtained from the acceleration sensor 12 is higher than or equal to a predetermined acceleration, the vehicle condition obtaining unit 26 further determines that the acceleration is high. If the acceleration is lower than the predetermined acceleration, the vehicle condition obtaining unit 26 further determines that the acceleration is low.

If the number of the occupants obtained from the seat pressure sensor 40 is greater than or equal to a predetermined number, the vehicle condition obtaining unit 26 further determines that the number of the occupants is large.

If the number of the occupants is less than the predetermined number, the vehicle condition obtaining unit 26 further determines that the number of the occupants is small.

If the weight of the load obtained from the load weight sensor 42 is higher than or equal to a predetermined weight, the vehicle condition obtaining unit 26 further determines that the weight of the load is high. If the weight of the load is lower than the predetermined weight, the vehicle condition obtaining unit 26 further determines that the weight of the load is low.

Next, in Step S7, the target acceleration/deceleration setting unit 28 sets an acceleration/deceleration correction factor based on the occupant conditions obtained in Step S4, the driving environment obtained in Step S5, and the vehicle conditions obtained in Step S6.

Specifically, the target acceleration/deceleration setting unit 28 obtains correction factors for all of the items described above (the occupant's physical condition, the occupant's driving tendency, the period when the vehicle 1 travels on the curve, the visibility of the curve, the traffic density of the curve, the road condition of the curve, the speed of the vehicle 1, the acceleration of the vehicle 1, and the number of the occupants riding in the vehicle 1, and the weight of the load carried by the vehicle 1) from the acceleration/deceleration correction factor map 32 exemplified in FIG. 2, in accordance with the determinations made by the occupant condition obtaining unit 22, the driving environment obtaining unit 24, and the vehicle condition obtaining unit 26, and determines a value obtained by multiplying the correction factors for all of these items to be the acceleration/deceleration correction factor.

In this embodiment, if the occupant condition obtaining unit 22 determines that the occupant is in good physical condition, the target acceleration/deceleration setting unit 28 obtains one as the correction factor for the occupant's physical condition. If the occupant condition obtaining unit 22 determines that the occupant is in poor physical condition, the target acceleration/deceleration setting unit 28 obtains 0.8 as the correction factor for the occupant's physical condition.

If the occupant condition obtaining unit 22 determines that the occupant tends to perform quick operations, the target acceleration/deceleration setting unit 28 obtains one as the correction factor for the occupant's driving tendency. If the occupant condition obtaining unit 22 determines that the occupant tends to perform slow operations, the target acceleration/deceleration setting unit 28 obtains 0.9 as the correction factor for the occupant's driving tendency.

If the driving environment obtaining unit 24 determines that the period when the vehicle 1 travels on the curve is during the daytime, the target acceleration/deceleration setting unit 28 further obtains one as the correction factor for the period. If the driving environment obtaining unit 24 determines that the period when the vehicle 1 travels on the curve is during the nighttime, the target acceleration/deceleration setting unit 28 further obtains 0.8 as the correction factor for the period.

If the driving environment obtaining unit 24 determines that the curve has high visibility, the target acceleration/deceleration setting unit 28 further obtains one as yet another the correction factor for the visibility. If the driving environment obtaining unit 24 determines that the curve has low visibility, the target acceleration/deceleration setting unit 28 further obtains 0.9 as the correction factor for the visibility.

If the driving environment obtaining unit 24 determines that the traffic density of the curve is high, the target acceleration/deceleration setting unit 28 further obtains 0.95 as the correction factor for the traffic density. If the driving environment obtaining unit 24 determines that the traffic density of the curve is low, the target acceleration/deceleration setting unit 28 further obtains one as the correction factor for the traffic density.

If the driving environment obtaining unit 24 determines that the curve has a high-$\mu$ surface, the target acceleration/deceleration setting unit 28 further obtains one as the correction factor for the curve surface. If the driving environment obtaining unit 24 determines that the curve has a low-$\mu$ surface, the target acceleration/deceleration setting unit 28 further obtains 0.8 as the correction factor for the curve surface.

If the vehicle condition obtaining unit 26 determines that the speed of the vehicle 1 is high, the target acceleration/deceleration setting unit 28 further obtains 0.9 as the correction factor for the vehicle speed. If the vehicle condition obtaining unit 26 determines that the speed of the vehicle 1 is low, the target acceleration/deceleration setting unit 28 further obtains one as the correction factor for the vehicle speed.

If the vehicle condition obtaining unit 26 determines that the acceleration of the vehicle 1 is high, the target acceleration/deceleration setting unit 28 further obtains 0.8 as the correction factor for the acceleration. If the vehicle condition obtaining unit 26 determines that the acceleration of the vehicle 1 is low, the target acceleration/deceleration setting unit 28 further obtains one as the correction factor for the acceleration.

If the vehicle condition obtaining unit 26 determines that the number of the occupants riding in the vehicle 1 is large, the target acceleration/deceleration setting unit 28 further obtains 0.9 as the correction factor for the number of the occupants. If the vehicle condition obtaining unit 26 determines that the number of the occupants riding in the vehicle 1 is small, the target acceleration/deceleration setting unit 28 further obtains one as the correction factor for the number of the occupants.

If the vehicle condition obtaining unit 26 determines that the weight of the load carried by the vehicle 1 is high, the target acceleration/deceleration setting unit 28 further obtains 0.9 as the correction factor for the weight of the load. If the vehicle condition obtaining unit 26 determines that the weight of the load carried by the vehicle 1 is low, the target acceleration/deceleration setting unit 28 further obtains one as the correction factor for the weight of the load.

Next, in Step S8, the target acceleration/deceleration setting unit 28 sets an acceleration/deceleration control curve (target accelerations and decelerations at different locations on the curve), based on the curve shape information obtained in Step S2, the maximum lateral acceleration Glmax obtained in Step S3, and the acceleration/deceleration correction factor determined in Step S7.

Specifically, the target acceleration/deceleration setting unit 28 sets a target acceleration or deceleration Gfent of the vehicle 1 in the direction of travel thereof at the location at which the curve starts (in the example shown in FIG. 3, the location B) to be a predetermined maximum deceleration Dmax, and sets a target acceleration or deceleration Gfext of the vehicle 1 in the direction of travel thereof at the location at which the curve ends (in the example shown in FIG. 3, the location D) to be a predetermined maximum acceleration Amax. The predetermined maximum deceleration Dmax is a deceleration having a magnitude equal to that of the maximum lateral acceleration Glmax (e.g., 4 m/s$^2$) in this embodiment. The predetermined maximum acceleration Amax is a maximum acceleration achievable by the vehicle 1 (e.g., 2 m/s²) in this embodiment. The target acceleration/deceleration setting unit 28 further sets a target acceleration or deceleration at a predetermined intermediate location between the location at which the curve starts and the location at which the curve ends (in this embodiment, the location at which the radius of curvature of the curve is smallest (in the example shown in FIG. 3, the location C)) to be 0 m/s².

In this embodiment, L1 is supposed to represent the travelling distance between the location at which the curve starts and the location at which the radius of curvature of the curve is smallest (the predetermined intermediate location), L2 is supposed to represent the travelling distance between the location at which the radius of curvature of the curve is smallest and the location at which the curve ends, K is supposed to represent the acceleration/deceleration correction factor, D (Ld) is supposed to represent a target deceleration at a location to which the travelling distance from the location at which the curve starts is equal to Ld between the location at which the curve starts and the location at which the radius of curvature of the curve is smallest, and A (La) is supposed to represent a target acceleration at a location to which the travelling distance from the location at which the radius of curvature of the curve is smallest is equal to La between the location at which the radius of curvature is smallest and the location at which the curve ends.

The target acceleration/deceleration setting unit 28 sets the target deceleration D (Ld) to satisfy the following expression:

$$D(Ld)=Dx+K\cdot(D\max\cdot\cos(\pi Ld/2L1)-Dx)$$

where Dx is expressed by the following expression:

$$Dx=D\max\cdot(1-Ld/L1)$$

The target acceleration/deceleration setting unit 28 further sets the target acceleration A (La) to satisfy the following expression:

$$A(La)=Ax+K\cdot(A\max\cdot\sin(\pi La/2L2)-Ax)$$

where Ax is expressed by the following expression:

$$Ax=A\max\cdot La/L2$$

Since the acceleration/deceleration correction factor K varies between zero and one, the target deceleration D (Ld) satisfies the following expression:

$$D\max\cdot(1-Ld/L1)\leq D(Ld)\leq D\max\cdot\cos(\pi Ld/2L1) \quad (1)$$

and the target acceleration A (La) satisfies the following expression:

$$A\max\cdot La/L2\leq A(La)\leq A\max\cdot\sin(\pi La/2L2) \quad (2)$$

A diagram showing a variation of the target deceleration D (Ld) with respect to the travelling distance Ld from the location at which the curve starts between the location at which the curve starts and the location at which the radius of curvature of the curve is smallest shows a portion of the acceleration/deceleration control curve between the location at which the curve starts and the location at which the radius of curvature of the curve is smallest. As shown in FIG. 5, the portion of the acceleration/deceleration control curve between the location at which the curve starts (the location B) and the location at which the radius of curvature of the curve is smallest (the location C) varies, according to the acceleration/deceleration correction factor K, in a region defined by the straight line connecting together the point at which a predetermined maximum deceleration (in FIG. 5, 4 m/s²) is obtained at the location at which the curve starts and the point at which a target acceleration/deceleration of 0 m/s² is obtained at the location at which the radius of curvature of the curve is smallest (see the broken line shown in FIG. 5) and the sine curve passing through both the points (see the dot-and-dash line shown in FIG. 5). In other words, the target acceleration/deceleration setting unit 28 sets the target deceleration D (Ld) according to the occupant conditions obtained by the occupant condition obtaining unit 22, the driving environment obtained by the driving environment obtaining unit 24, and the vehicle conditions obtained by the vehicle condition obtaining unit 26 such that the target deceleration D (Ld) satisfies the expression (1). The closer from zero to one the acceleration/deceleration correction factor K is, the closer from the straight line to the sine curve the shape of the portion of the acceleration/deceleration control curve between the location at which the curve starts and the location at which the radius of curvature of the curve is smallest is.

A diagram showing a variation of the target acceleration A (La) with respect to the travelling distance La from the location at which the radius of curvature of the curve is smallest between the location at which the radius of curvature of the curve is smallest and the location at which the curve ends shows a portion of the acceleration/deceleration control curve between the location at which the radius of curvature of the curve is smallest and the location at which the curve ends. As shown continuously with the portion of the acceleration/deceleration control curve between the location at which the curve starts and the location at which the radius of curvature of the curve is smallest in FIG. 5, the portion of the acceleration/deceleration control curve between the location at which the radius of curvature of the curve is smallest (the location C) and the location at which the curve ends (the location D) varies, according to the acceleration/deceleration correction factor K, in a region defined by a straight line and a sine curve. The straight line connects together the point at which a target acceleration/deceleration of 0 m/s² is obtained at the location at which the radius of curvature of the curve is smallest (see the broken line shown in FIG. 5) and the point at which a predetermined maximum acceleration (in FIG. 5, 2 m/s²) is obtained at the location at which the curve ends. The sine curve passes through both the points (see the dot-and-dash line shown in FIG. 5). In other words, the target acceleration/deceleration setting unit 28 sets the target acceleration A (La) according to the occupant conditions obtained by the occupant condition obtaining unit 22, the driving environment obtained by the driving environment obtaining unit 24, and the vehicle conditions obtained by the vehicle condition obtaining unit 26 such that the target acceleration A (La) satisfies the expression (2). The closer from zero to one the acceleration/deceleration correction factor K is, the closer from the straight line to the sine curve the shape of the portion of the acceleration/deceleration control curve between the location at which the radius of curvature of the curve is smallest and the location at which the curve ends is.

Next, in Step S9, the target acceleration/deceleration setting unit 28 determines the initial velocity of the vehicle (the speed at which the vehicle enters the curve) at the location at which the curve starts, based on the curve shape information obtained in Step S2 and the acceleration/deceleration control curve set in Step S8.

Specifically, the target acceleration/deceleration setting unit 28 first sets the initial velocity at the location at which the curve starts to be a preset initial value, and calculates the vehicle speeds at the different locations from the location at which the curve starts to the location at which the curve ends, based on the initial value and the acceleration/deceleration control curve. Subsequently, lateral accelerations generated at the different locations on the curve are calculated based on the calculated vehicle speeds at the different locations and the radii of curvature of the curve at the different locations. Next, if a maximum value of a resultant acceleration of the accelerations and decelerations of the vehicle in the direction of travel thereof and the lateral accelerations thereof from the location at which the curve starts to the location at which the curve ends is greater than the maximum lateral acceleration Glmax that may be applied to the vehicle 1 during cornering, the initial velocity at the location at which the curve starts is decreased from the initial value. On the other hand, if the maximum value of the resultant acceleration is less than the maximum lateral acceleration Glmax, the initial velocity at the location at which the curve starts is increased from the initial value. Subsequently, convergence calculation is performed using the initial velocity at the location at which the curve starts as a parameter in a similar manner so that the maximum value of the resultant acceleration agrees with the maximum lateral acceleration Glmax, thereby determining the initial velocity at the location at which the curve starts.

Next, in Step S10, the acceleration/deceleration control unit 30 informs the occupant that autonomous driving (automatic control of the acceleration and deceleration of the vehicle 1 on the curve (acceleration/deceleration control)) is started.

Next, in Step S11, the acceleration/deceleration control unit 30 controls the engine 34 and brake 36 of the vehicle 1 such that the vehicle 1 enters the curve at the initial velocity determined in Step S9, and after the vehicle 1 enters the curve, controls the acceleration and deceleration of the vehicle 1 in accordance with the acceleration/deceleration control curve set in Step S8. In other words, the acceleration/deceleration control unit 30 controls the brake 36 and engine 34 of the vehicle 1 such that the accelerations and decelerations on the acceleration/deceleration control curve set in Step S8 are generated from the location at which the curve starts to the location at which the curve ends.

After Step S11, the ECU 16 finishes the acceleration/deceleration control process.

Next, the acceleration or deceleration of the vehicle 1 which travels on the curve which is generated by the acceleration/deceleration control process performed by the ECU 16 will be described with reference to FIGS. 5 and 6.

Figure 6:
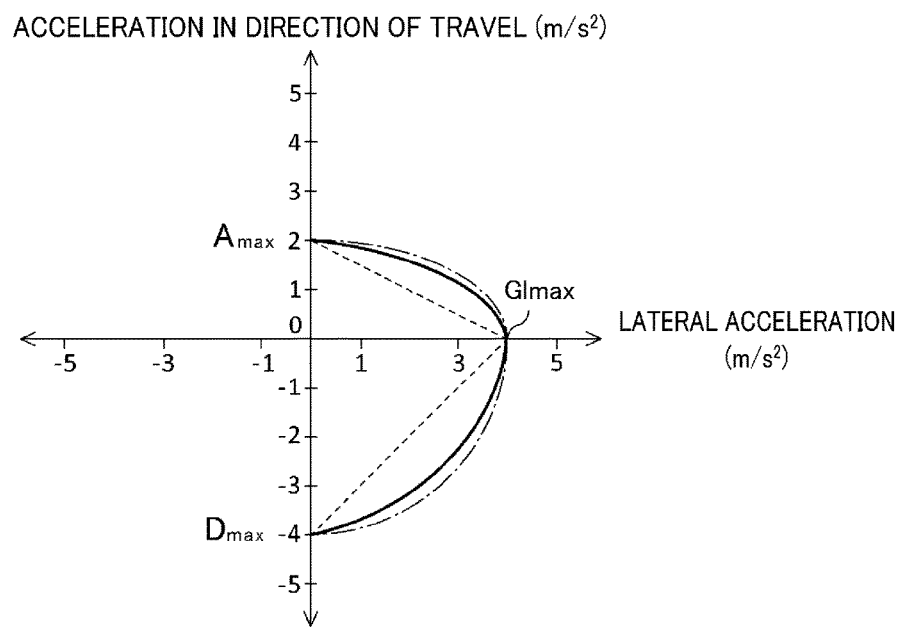
FIG. 6 is a diagram in which coordinates (Gl, Gf) are plotted on a plane of coordinates including X coordinates corresponding to lateral accelerations Gl applied to a vehicle traveling on a curve, and Y coordinates corresponding to accelerations Gf of the vehicle in the direction of travel thereof (a G-G diagram showing the relation between the lateral accelerations Gl and the accelerations or decelerations Gf). The lateral accelerations Gl and the accelerations or decelerations Gf are applied to the vehicle acceleration/deceleration controller according to the first embodiment performing the acceleration/deceleration control process.

FIG. 6 is a diagram in which coordinates (Gl, Gf) are plotted on a plane of coordinates including X coordinates representing lateral accelerations Gl of the vehicle 1 which travels on the curve which is generated by the acceleration/deceleration control process performed by the ECU 16, and Y coordinates representing accelerations or decelerations Gf of the vehicle 1 in the direction of travel thereof (a G-G diagram showing the relation between the lateral accelerations Gl and the accelerations or decelerations Gf). In FIG. 6, the acceleration of the vehicle 1 in the direction of travel thereof is a positive value along the y axis on the plane of coordinates, and the deceleration of the vehicle 1 in the direction of travel thereof is a negative value along the y axis on the plane of coordinates. The lateral acceleration of the vehicle 1 acting rightward thereof is a positive value along the x axis on the plane of coordinates, and the lateral acceleration of the vehicle 1 acting leftward thereof is a negative value along the x axis on the plane of coordinates.

As has been already described with reference to FIG. 5, the portion of the acceleration/deceleration control curve between the location at which the curve starts and the location at which the radius of curvature of the curve is smallest varies in the region defined by the straight line and the sine curve both connecting together the predetermined maximum deceleration at the location at which the curve starts and the target acceleration/deceleration (0 m/s$^2$) at the location at which the radius of curvature of the curve is smallest. The portion of the acceleration/deceleration control curve between the location at which the radius of curvature of the curve is smallest and the location at which the curve ends varies in the region defined by the straight line and the sine curve both connecting together the target acceleration/deceleration (0 m/s$^2$) at the location at which the radius of curvature of the curve is smallest and the predetermined maximum acceleration at the location at which the curve ends. The closer from zero to one the acceleration/deceleration correction factor K is, the closer from the straight line (the broken line shown in FIG. 5) to the sine curve (the dot-and-dash line shown in FIG. 5) the shape of each of these portions of the acceleration/deceleration control curve is.

Thus, as shown in FIG. 6, if the coordinates (Gl, Gf) are plotted on the plane of coordinates including X coordinates representing the lateral accelerations Gl applied to the vehicle 1 which travels on the curve, and Y coordinates representing the accelerations and decelerations Gf of the vehicle 1 in the direction of travel thereof, one of the plotted coordinates, specifically, the acceleration/deceleration coordinate (Gl, Gf) of the vehicle 1 at the location at which the curve starts and at which the lateral acceleration Gl is 0 m/s$^2$ and the acceleration or deceleration Gf is a maximum deceleration, is (0, −4). The acceleration/deceleration coordinate at the location at which the radius of curvature of the curve is smallest and at which the lateral acceleration Gl is a maximum lateral acceleration Glmax and the acceleration or deceleration Gf of the vehicle in the direction of travel thereof is 0 m/s$^2$ is (4, 0). Furthermore, the acceleration/deceleration coordinate at the location at which the curve ends and at which the lateral acceleration Gl is 0 m/s$^2$ and the acceleration/deceleration Gf of the vehicle in the direction of travel thereof is a maximum acceleration is (0, 2). If the acceleration/deceleration coordinates (Gl, Gf) at different locations from the location at which the curve starts to the location at which the curve ends are connected together, the curve indicated by the solid line shown in FIG. 6 is formed. This curve passes through the acceleration/deceleration coordinates (0, −4), (4, 0), and (0, 2).

Figure 5:
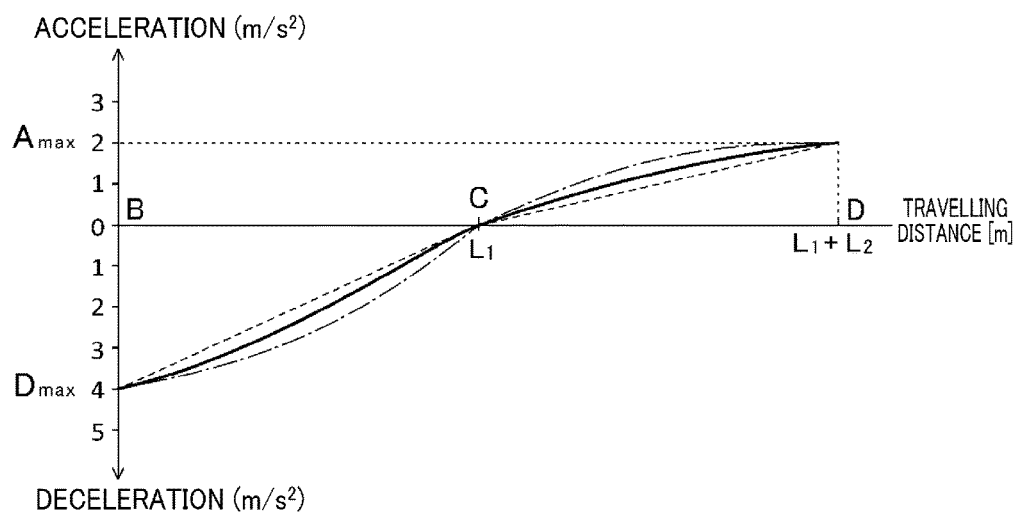
FIG. 5 is a diagram showing an acceleration/deceleration control curve set by the vehicle acceleration/deceleration controller according to the first embodiment.

In FIG. 6, the straight line (broken line) and curve (dot-and-dash line) connecting together the acceleration/deceleration coordinates (0, −4) and (4, 0) respectively correspond to the straight line and sine curve shown in FIG. 5 and connecting together the predetermined maximum deceleration at the location at which the curve starts and the target acceleration/deceleration (0 m/s$^2$) at the location at which the radius of curvature of the curve is smallest. In FIG. 6, the straight line (broken line) and curve (dot-and-dash line) connecting together the acceleration/deceleration coordinates (4, 0) and (0, 2) respectively correspond to the straight line and sine curve shown in FIG. 5 and connecting together the target acceleration/deceleration (0 m/s$^2$) at the location at which the radius of curvature of the curve is smallest and the predetermined maximum acceleration at the location at which the curve ends. Also in FIG. 6, as in FIG. 5, the closer from zero to one the acceleration/deceleration correction factor K is, the closer from the straight line indicated by the broken line to the curve indicated by the dot-and-dash line the shape of the curve connecting together the acceleration/deceleration coordinates at the different locations is. If the shape of the curve is closer to the curve indicated by the dot-and-dash line as described above, the occupant in the vehicle 1 feels that the vehicle 1 is travelling on the curve at or near the limit of the tire performance.

Second Embodiment

Next, a vehicle acceleration/deceleration controller according to a second embodiment of the present invention will be described with reference to FIGS. 7 and 8. In the second embodiment, the shape of the acceleration/deceleration control curve obtained in a situation where the acceleration/deceleration correction factor K is varied between zero and one is different from that in the first embodiment described above. As a result, the shape of the curve connecting together the acceleration/deceleration coordinates (Gl, Gf) plotted on the G-G diagram is also different from that in the first embodiment. The other configurations of the vehicle acceleration/deceleration controller are the same as those of the first embodiment. Thus, the differences from the first embodiment will be mainly described below.

Figure 7:
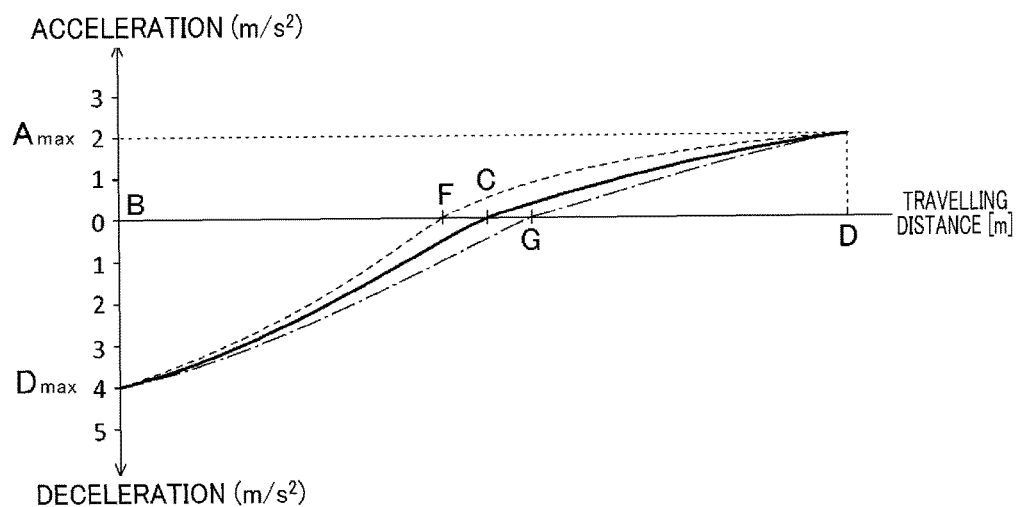
FIG. 7 is a diagram showing an acceleration/deceleration control curve set by a vehicle acceleration/deceleration controller according to a second embodiment.

FIG. 7 is a diagram showing an acceleration/deceleration control curve set by the vehicle acceleration/deceleration controller (ECU 16) according to the second embodiment. FIG. 8 is a diagram in which coordinates (Gl, Gf) are plotted on a plane of coordinates including X coordinates representing lateral accelerations of the vehicle 1 which travels on the curve which is generated by the acceleration/deceleration control process performed by the vehicle acceleration/deceleration controller according to the second embodiment, and Y coordinates representing accelerations and decelerations Gf of the vehicle 1 in the direction of travel thereof (a G-G diagram showing the relation between the lateral accelerations Gl and the accelerations or decelerations Gf).

In the second embodiment, in Step S8 shown in FIG. 4, the target acceleration/deceleration setting unit 28 sets an acceleration/deceleration control curve, based on the curve shape information obtained in Step S2, the maximum lateral acceleration Glmax obtained in Step S3, and the acceleration/deceleration correction factor K determined in Step S7.

Specifically, the target acceleration/deceleration setting unit 28 sets a target acceleration or deceleration Gfent of the vehicle 1 in the direction of travel thereof at the location at which the curve starts (in the example shown in FIG. 3, the location B) to be a predetermined maximum deceleration Dmax, and sets a target acceleration or deceleration Gfext of the vehicle 1 in the direction of travel thereof at the location at which the curve ends (in the example shown in FIG. 3, the location D) to be a predetermined maximum acceleration Amax. The predetermined maximum deceleration Dmax is a deceleration having a magnitude equal to that of the maximum lateral acceleration Glmax (e.g., 4 m/s$^2$) in this embodiment. The predetermined maximum acceleration Amax is a maximum acceleration achievable by the vehicle 1 (e.g., 2 m/s$^2$) in this embodiment. The target acceleration/deceleration setting unit 28 further sets a target acceleration or deceleration at a predetermined intermediate location between the location at which the curve starts and the location at which the curve ends to be 0 m/s$^2$. In this embodiment, unlike the first embodiment, the predetermined intermediate location is a location that is a predetermined distance Lm offset from the location at which the radius of curvature of the curve is smallest toward the location at which the curve starts or toward the location at which the curve ends (in the example shown in FIG. 3, the location F or G). In this embodiment, the predetermined distance Lm is proportional to (1−K). In other words, if the acceleration/deceleration correction factor K is zero, the predetermined distance Lm is longest, and if the acceleration/deceleration correction factor K is one, the predetermined distance Lm is zero, i.e., the predetermined intermediate location is a location at which the radius of curvature of the curve is smallest.

Then, the target acceleration/deceleration setting unit 28 sets a target deceleration D (Ld) at a location to which the travelling distance from the location at which the curve starts is Ld between the location at which the curve starts and the predetermined intermediate location to satisfy the following expression:

$$D(Ld) = Dmax \cdot \cos(\pi Ld / 2L1)$$

The target acceleration/deceleration setting unit 28 further sets a target acceleration A (La) at a location to which the travelling distance from the predetermined intermediate location is La between the predetermined intermediate location and the location at which the curve ends to satisfy the following expression:

$$A(La) = Amax \cdot \sin(\pi La / 2L2)$$

Specifically, as shown in FIG. 7, a portion of the acceleration/deceleration control curve between the location at which the curve starts and the predetermined intermediate location (indicated by the broken line or dot-and-dash line shown in FIG. 7) forms a sine curve passing through the point at which a maximum deceleration (in FIG. 7, 4 m/s$^2$) is obtained at the location at which the curve starts and the point at which a target acceleration/deceleration of 0 m/s$^2$ is obtained at the predetermined intermediate location.

Likewise, a portion of the acceleration/deceleration control curve between the predetermined intermediate location and the location at which the curve ends forms a sine curve passing through the point at which a target acceleration/deceleration of 0 m/s$^2$ is obtained at the predetermined intermediate location and the point at which a maximum acceleration (in FIG. 7, 2 m/s$^2$) is obtained at the location at which the curve ends.

Figure 8:
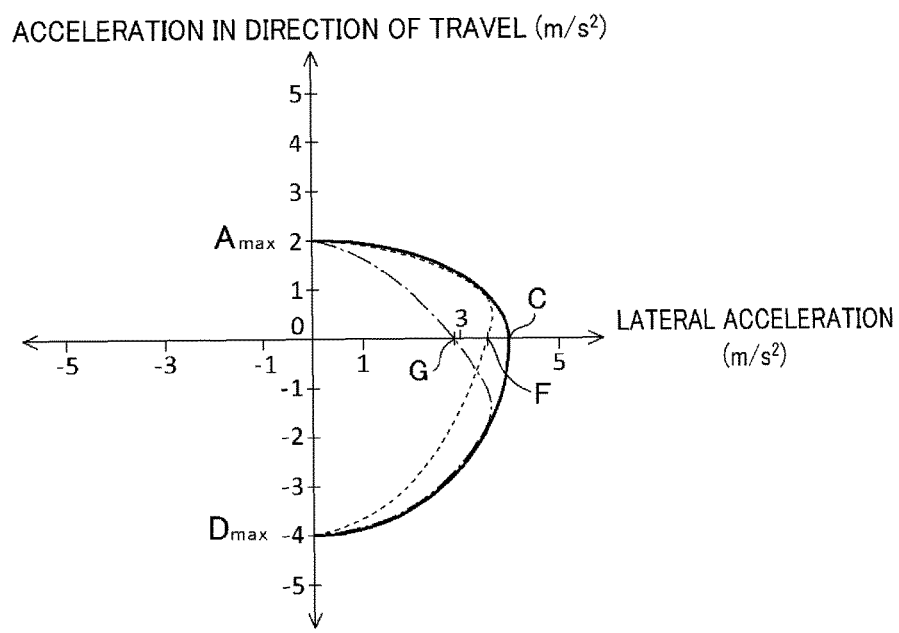
FIG. 8 is a diagram in which coordinates (Gl, Gf) are plotted on a plane of coordinates including X coordinates corresponding to lateral accelerations Gl of a vehicle traveling on a curve, and Y coordinates corresponding to accelerations or decelerations Gf of the vehicle in the direction of travel thereof (a G-G diagram showing the relation between the lateral accelerations Gl and the accelerations or decelerations Gf). The lateral accelerations Gl and the accelerations or decelerations Gf are generated by the vehicle acceleration/deceleration controller according to the second embodiment performing the acceleration/deceleration control process.

Thus, as shown in FIG. 8, if the coordinates (Gl, Gf) are plotted on the plane of coordinates including X coordinates representing the lateral accelerations Gl applied to the vehicle 1 which travels on the curve, and Y coordinates representing the accelerations or decelerations Gf of the vehicle 1 in the direction of travel thereof, one of the plotted coordinates, specifically, the acceleration/deceleration coordinate (Gl, Gf) of the vehicle 1 at the location at which the curve starts and at which the lateral acceleration Gl is 0 m/s$^2$ and the acceleration or deceleration Gf is a maximum deceleration, is (0, −4). The acceleration/deceleration coordinate at the predetermined intermediate location at which the acceleration or deceleration Gf of the vehicle in the direction of travel thereof is 0 m/s$^2$ is (Gl, 0). Furthermore, the acceleration/deceleration coordinate at the location at which the curve ends and at which the lateral acceleration Gl is 0 m/s$^2$ and the acceleration or deceleration Gf of the vehicle in the direction of travel thereof is a maximum acceleration is (0, 2). If the acceleration/deceleration coordinates (Gl, Gf) at different locations from the location at which the curve starts to the location at which the curve ends are connected together, the curve indicated by the broken line or dot-and-dash line shown in FIG. 8 is formed. This curve passes through the acceleration/deceleration coordinates (0, −4), (Gl, 0), and (0, 2).

In this embodiment, if, in Step S8 shown in FIG. 4, a target acceleration or deceleration at the predetermined intermediate location (in the example shown in FIG. 3, the location F) that is a predetermined distance Lm offset from the location at which the radius of curvature of the curve is smallest toward the location at which the curve starts is set to be 0 m/s$^2$, the lateral acceleration Gl is highest at a location closer to the location at which the curve ends than the predetermined intermediate location is, as indicated by the broken line shown in FIG. 8. In other words, it is highest while the vehicle 1 is accelerating. This allows the occupant to feel safe, i.e., to feel that the vehicle 1 is cornering after decelerating sufficiently.

On the other hand, if, in Step S8 shown in FIG. 4, a target acceleration or deceleration at the predetermined intermediate location (in the example shown in FIG. 3, the location G) that is the predetermined distance Lm offset from the location at which the radius of curvature of the curve is smallest toward the location at which the curve ends is set to be 0 m/s$^2$, the lateral acceleration Gl is highest at a location closer to the location at which the curve starts than the predetermined intermediate location is, as indicated by the dot-and-dash line shown in FIG. 8. In other words, it is highest while the vehicle 1 is decelerating. In this case, while the vehicle 1 is decelerating, the lateral acceleration starts decreasing. This may offer a sense of safety to the occupant, who may feel that the vehicle 1 is cornering well within the tire performance.

The closer from zero to one the acceleration/deceleration correction factor K is (i.e., the closer to the location at which the radius of curvature of the curve is smallest the predetermined intermediate location is), the closer to the location at which the radius of curvature of the curve is smallest the location at which the lateral acceleration Gl is highest is as indicated by the solid line shown in FIG. 8. This allows the occupant riding in the vehicle 1 to feel that the vehicle 1 is travelling on the curve at or near the limit of the tire performance.

(Variation)

Next, a further variation of the embodiments of the present invention will be described.

In each of the embodiments described above, a situation where the vehicle 1 includes, as a power source, the engine 34, such as a petrol engine or a diesel engine, has been described as an example. However, a battery-operated motor may be used as the power source of the vehicle 1 instead of this engine 34 or together with this engine 34. In this case, the acceleration/deceleration control unit 30 controls the motor (or the motor and the engine 34) and brake 36 of the vehicle 1 in accordance with the acceleration/deceleration control curve set in the acceleration/deceleration control process.

In each of the embodiments described above, it has been described that if the automatic operation switch 44 is turned on, the ECU 16 (vehicle acceleration/deceleration controller) controls the acceleration and deceleration of the vehicle 1 on the curve. However, to assist the occupant (driver) in operating the vehicle irrespective of whether the automatic operation switch 44 is on or off, the vehicle acceleration/deceleration controller of the present invention may be used. In this case, the vehicle acceleration/deceleration controller assists the occupant in operating the accelerator and brake so that the vehicle 1 accelerates or decelerates in accordance with the acceleration/deceleration control curve set in the acceleration/deceleration control process.

Furthermore, in each of the embodiments described above, if the vehicle condition obtaining unit 26 determines that the speed of the vehicle 1 is high, the target acceleration/deceleration setting unit 28 obtains 0.9 as a correction factor. If the vehicle condition obtaining unit 26 determines that the speed of the vehicle 1 is low, the target acceleration/deceleration setting unit 28 obtains one as the correction factor. However, the correction factor may be successively changed so that the lower the speed detected by the vehicle speed sensor 10 is, the greater the correction factor corresponding to the speed is, i.e., the closer to one the correction factor corresponding to the speed (and thus the acceleration/deceleration correction factor K) is.

Like the correction factor corresponding to the speed, the correction factor may be successively changed so that the lower the acceleration detected by the acceleration sensor 12 is, the greater the correction factor corresponding to the acceleration is (the closer to one the correction factor corresponding to the acceleration (and thus the acceleration/deceleration correction factor K) is).

Likewise, the correction factor may be successively changed so that the less the number of the occupants riding in the vehicle 1 is, the greater the correction factor corresponding to the number of the occupants is, i.e., the closer to one the correction factor corresponding to the number of the occupants (and thus the acceleration/deceleration correction factor K) is. Furthermore, the correction factor may be successively changed so that the lower the weight of the load carried by the vehicle 1 is, the less the correction factor corresponding to the weight of the load is, i.e., the closer to one the correction factor corresponding to the weight of the load (and thus the acceleration/deceleration correction factor K) is.

By combining the first and second embodiments described above together, the portion of the acceleration/deceleration control curve between the location at which the curve starts and the predetermined intermediate location of the second embodiment (the location that is the predetermined distance Lm offset from the location at which the radius of curvature of the curve is smallest toward the location at which the curve starts or ends) may vary in a region defined by the straight line and the sine curve both connecting together the maximum deceleration at the location at which the curve starts and the target acceleration or deceleration (0 m/s$^2$) at the predetermined intermediate location, and the portion of the acceleration/deceleration control curve between the predetermined intermediate location and the location at which the curve ends may vary in a region defined by the straight line and the sine curve connecting together the target acceleration or deceleration (0 m/s$^2$) at the predetermined intermediate location and the maximum acceleration at the location at which the curve ends. Also in this case, the closer from zero to one the acceleration/deceleration correction factor K is, the closer from the straight line to the sine curve the shape of the acceleration/deceleration control curve is.

(Advantages)

Next, advantages of the vehicle acceleration/deceleration controller according to each of the first and second embodiments and variation of the present invention described above will be described.

First, the target acceleration/deceleration setting unit 28 sets the target deceleration D (Ld) at the location to which the travelling distance from the location at which the curve starts is Ld between the location at which the curve starts and the predetermined intermediate location at which the target acceleration or deceleration is set to be 0 m/s$^2$ to satisfy the expression (1), and sets the target acceleration A (La) at the location to which the travelling distance from the predetermined intermediate location is La between the predetermined intermediate location and the location at which the curve ends to satisfy the expression (2). Thus, the direction and magnitude of the acceleration or deceleration felt by the occupant while the vehicle 1 is travelling from the location at which the curve starts to the location at which the curve ends may be smoothly changed to make it difficult for the occupant to feel insecure. This may improve the occupant comfort and reduce the sense of strangeness felt by the occupant while offering a sense of safety to the occupant in the course of travel of the vehicle 1 from the entry of the vehicle 1 into the curve to the exit of the vehicle 1 from the curve.

If the predetermined intermediate location at which the target acceleration/deceleration setting unit 28 sets the target acceleration or deceleration to be 0 m/s² is the location at which the radius of curvature of the curve is smallest, the vehicle 1 does not decelerate excessively or insufficiently, and the occupant may be caused to feel that the vehicle 1 is cornering smoothly with the tire performance efficiently utilized, thereby further improving the occupant comfort.

If the predetermined intermediate location is a location between the location at which the curve starts and the location at which the radius of curvature of the curve is smallest, a sense of safety may be offered to the occupant, who may feel that the vehicle 1 is cornering after decelerating sufficiently.

If the predetermined intermediate location is a location between the location at which the curve ends and the location at which the radius of curvature of the curve is smallest, decreasing the lateral acceleration of the vehicle 1 may be started while the vehicle 1 is decelerating. This may offer a sense of safety to the occupant, who may feel that the vehicle 1 is cornering well within the tire performance.

Furthermore, the target acceleration/deceleration setting unit 28 sets a target acceleration or deceleration (a predetermined maximum deceleration) at the location at which the curve starts to be a deceleration having a magnitude equal to that of a maximum lateral acceleration that may be applied to the vehicle 1 during cornering. This allows the magnitude of a deceleration felt by the occupant at the point in time when the vehicle 1 enters the curve to agree with the magnitude of a maximum lateral acceleration felt by the occupant while the vehicle 1 is travelling on the curve, and allows the direction and magnitude of an acceleration felt by the occupant while the vehicle 1 is travelling on the curve to be smoothly changed. Thus, in the course of travel of the vehicle 1 from the entry of the vehicle 1 into the curve to the exit of the vehicle 1 from the curve, the direction and magnitude of an inertial force acting on the vehicle 1 and the occupant may be smoothly changed, thereby improving the occupant comfort and reducing the sense of strangeness felt by the occupant.

The target acceleration/deceleration setting unit 28 sets the target deceleration D (Ld) within the range of target decelerations satisfying the expression (1) in accordance with the occupant conditions obtained by the occupant condition obtaining unit 22, and sets the target acceleration A (La) within the range of target accelerations satisfying the expression (2) in accordance with the occupant conditions obtained by the occupant condition obtaining unit 22. Thus, the direction and magnitude of an acceleration or deceleration felt by the occupant while the vehicle 1 is travelling from the location at which the curve starts to the location at which the curve ends may be more smoothly changed in accordance with the occupant conditions, or may be changed to make it more difficult for the occupant to feel insecure.

In particular, if the occupant is in good physical condition, the target acceleration/deceleration setting unit 28 sets the target deceleration D (Ld) and the target acceleration A (La) to be closer to Dmax·cos($\pi$Ld/2L1) and Amax·sin($\pi$La/2L2), respectively, than if the occupant is not in good physical condition (is in poor physical condition). As a result, if the occupant is in good physical condition, and while the vehicle is travelling on the curve, the occupant is thus less likely to feel insecure, the acceleration or deceleration of the vehicle 1 may be changed to allow the occupant to feel that the vehicle 1 is cornering smoothly with the tire performance more efficiently utilized. On the other hand, if the occupant is not in good physical condition, and while the vehicle is travelling on the curve, the occupant is thus more likely to feel insecure, the acceleration or deceleration of the vehicle 1 may be changed to make it more difficult for the occupant to feel insecure.

If the occupant tends to perform quick operations, the target acceleration/deceleration setting unit 28 sets the target deceleration D (Ld) and the target acceleration A (La) to be closer to Dmax·cos($\pi$Ld/2L1) and Amax·sin($\pi$La/2L2), respectively, than if the occupant does not tend to perform quick operations (tends to perform slow operations). As a result, if the occupant tends to perform quick operations, and while the vehicle is travelling on the curve, the occupant is thus less likely to feel insecure, the acceleration or deceleration of the vehicle 1 may be changed to allow the occupant to feel that the vehicle 1 is cornering smoothly with the tire performance more efficiently utilized. On the other hand, if the occupant does not tend to perform quick operations, and while the vehicle is travelling on the curve, the occupant is thus more likely to feel insecure, the acceleration or deceleration of the vehicle 1 may be changed to make it more difficult for the occupant to feel insecure. Thus, the acceleration or deceleration may be changed to adapt to the occupant's driving tendency.

In particular, if the occupant condition obtaining unit 22 determines whether or not the occupant tends to perform quick operations based on information on the accelerations applied to the vehicle 1 by the occupant's past operations, the occupant's driving tendency relating to the acceleration/deceleration of the vehicle 1 may be appropriately determined.

The target acceleration/deceleration setting unit 28 sets the target deceleration D (Ld) within the range of target decelerations satisfying the expression (1) in accordance with the vehicle conditions obtained by the vehicle condition obtaining unit 26, and sets the target acceleration A (La) within the range of target accelerations satisfying the expression (2) in accordance with the vehicle conditions obtained by the vehicle condition obtaining unit 26. Thus, the direction and magnitude of an acceleration or deceleration felt by the occupant while the vehicle 1 is travelling from the location at which the curve starts to the location at which the curve ends may be more smoothly changed in accordance with the vehicle conditions, or may be changed to make it more difficult for the occupant to feel insecure.

In particular, the target acceleration/deceleration setting unit 28 sets the target deceleration D (Ld) and the target acceleration A (La) such that the lower the speed of the vehicle 1 is, the closer to Dmax·cos($\pi$Ld/2L1) the target deceleration D (Ld) is, and the closer to Amax·sin($\pi$La/2L2) the target acceleration A (La) is. As a result, if the speed of the vehicle 1 is low, and the occupant is thus less likely to feel insecure, the acceleration or deceleration of the vehicle 1 may be changed to allow the occupant to feel that the vehicle 1 is cornering smoothly with the tire performance more efficiently utilized. On the other hand, if the speed of the vehicle 1 is high, and the occupant is thus more likely to feel insecure, the acceleration or deceleration of the vehicle 1 may be changed to make it more difficult for the occupant to feel insecure.

The target acceleration/deceleration setting unit 28 sets the target deceleration D (Ld) and the target acceleration A (La) such that the lower the acceleration of the vehicle 1 is, the closer to Dmax·cos($\pi$Ld/2L1) the target deceleration D (Ld) is, and the closer to Amax·sin($\pi$La/2L2) the target acceleration A (La) is. As a result, if the acceleration of the vehicle 1 is low, and the occupant is thus less likely to feel insecure, the acceleration or deceleration of the vehicle 1 may be changed to allow the occupant to feel that the vehicle 1 is cornering smoothly with the tire performance more efficiently utilized. On the other hand, if the acceleration of the vehicle 1 is high, and the occupant is thus more likely to feel insecure, the acceleration or deceleration of the vehicle 1 may be changed to make it more difficult for the occupant to feel insecure.

The target acceleration/deceleration setting unit 28 sets the target deceleration D (Ld) and the target acceleration A (La) such that the smaller the number of the occupants riding in the vehicle 1 is, the closer to Dmax·cos($\pi$Ld/2L1) the target deceleration D (Ld) is, and the closer to Amax·sin($\pi$La/2L2) the target acceleration A (La) is. As a result, if the weight of the vehicle 1 is low due to the fact that the number of the occupants is small, and while the vehicle 1 is travelling on the curve, the occupant is thus less likely to feel insecure, the acceleration or deceleration of the vehicle 1 may be changed to allow the occupant to feel that the vehicle 1 is cornering smoothly with the tire performance more efficiently utilized. On the other hand, if the weight of the vehicle 1 is high due to the fact that the number of the occupants is large, and while the vehicle 1 is travelling on the curve, the occupant is thus more likely to feel insecure, the acceleration or deceleration of the vehicle 1 may be changed to make it more difficult for the occupant to feel insecure.

The target acceleration/deceleration setting unit 28 sets the target deceleration D (Ld) and the target acceleration A (La) such that the lower the weight of the load carried by the vehicle 1 is, the closer to Dmax·cos($\pi$Ld/2L1) the target deceleration D (Ld) is, and the closer to Amax·sin($\pi$La/2L2) the target acceleration A (La) is. As a result, if the weight of the vehicle 1 is low due to the fact that the weight of the load is low, and while the vehicle 1 is travelling on the curve, the occupant is thus less likely to feel insecure, the acceleration or deceleration of the vehicle 1 may be changed to allow the occupant to feel that the vehicle 1 is cornering smoothly with the tire performance more efficiently utilized. On the other hand, if the weight of the vehicle 1 is high due to the fact that the weight of the load is high, and while the vehicle 1 is travelling on the curve, the occupant is thus more likely to feel insecure, the acceleration or deceleration of the vehicle 1 may be changed to make it more difficult for the occupant(s) to feel insecure.

Furthermore, the target acceleration/deceleration setting unit 28 sets the target deceleration D (Ld) within the range of target decelerations satisfying the expression (1) in accordance with the driving environment obtained by the driving environment obtaining unit 24, and sets the target acceleration A (La) within the range of target accelerations satisfying the expression (2) in accordance with the driving environment obtained by the driving environment obtaining unit 24. Thus, the direction and magnitude of an acceleration or deceleration felt by the occupant while the vehicle 1 is travelling from the location at which the curve starts to the location at which the curve ends may be more smoothly changed in accordance with the driving environment, or may be changed to make it more difficult for the occupant to feel insecure.

In particular, if the period when the vehicle 1 travels on the curve is during the daytime, the target acceleration/deceleration setting unit 28 sets the target deceleration D (Ld) and the target acceleration A (La) to be closer to Dmax·cos($\pi$Ld/2L1) and Amax·sin($\pi$La/2L2), respectively, than if the period is not during the daytime (is during the nighttime). As a result, if the vehicle travels during the daytime when it is bright outside the vehicle, and the occupant is thus less likely to feel insecure, the acceleration or deceleration of the vehicle 1 may be changed to allow the occupant to feel that the vehicle 1 is cornering smoothly with the tire performance more efficiently utilized. On the other hand, if the vehicle travels during the nighttime when it is dark outside the vehicle, and the occupant is thus more likely to feel insecure, the acceleration or deceleration of the vehicle 1 may be changed to make it more difficult for the occupant to feel insecure.

If the curve has high visibility, the target acceleration/deceleration setting unit 28 sets the target deceleration D (Ld) and the target acceleration A (La) to be closer to Dmax·cos($\pi$Ld/2L1) and Amax·sin($\pi$La/2L2), respectively, than if the curve does not have high visibility (has low visibility). As a result, if the curve has high visibility, and while the vehicle 1 is travelling on the curve, the occupant is thus less likely to feel insecure, the acceleration or deceleration of the vehicle 1 may be changed to allow the occupant to feel that the vehicle 1 is cornering smoothly with the tire performance more efficiently utilized. On the other hand, if the curve has low visibility, and while the vehicle 1 is travelling on the curve, the occupant is thus more likely to feel insecure, the acceleration or deceleration of the vehicle 1 may be changed to make it more difficult for the occupant(s) to feel insecure.

If the traffic density of the curve is not high (is low), the target acceleration/deceleration setting unit 28 sets the target deceleration D (Ld) and the target acceleration A (La) to be closer to Dmax·cos($\pi$Ld/2L1) and Amax·sin($\pi$La/2L2), respectively, than if the traffic density is high. As a result, if the traffic density of the curve is low, and while the vehicle 1 is travelling on the curve, the occupant is thus less likely to feel insecure, the acceleration or deceleration of the vehicle 1 may be changed to allow the occupant to feel that the vehicle 1 is cornering smoothly with the tire performance more efficiently utilized. On the other hand, if the traffic density of the curve is high, and while the vehicle 1 is travelling on the curve, the occupant is thus more likely to feel insecure, the acceleration or deceleration of the vehicle 1 may be changed to make it more difficult for the occupant to feel insecure.

If the curve has a high-$\mu$ surface (the road surface has a high friction coefficient), the target acceleration/deceleration setting unit 28 sets the target deceleration D (Ld) and the target acceleration A (La) to be closer to Dmax·cos($\pi$Ld/2L1) and Amax·sin($\pi$La/2L2), respectively, than if the curve has a low-$\mu$ surface (the road surface does not have a high friction coefficient). As a result, if the curve has a high-$\mu$ surface, and while the vehicle 1 is travelling on the curve, the occupant is thus less likely to feel insecure, the acceleration or deceleration of the vehicle 1 may be changed to allow the occupant to feel that the vehicle 1 is cornering smoothly with the tire performance more efficiently utilized. On the other hand, if the curve has a low-j surface, and while the vehicle 1 is travelling on the curve, the occupant is thus more likely to feel insecure, the acceleration or deceleration of the vehicle 1 may be changed to make it more difficult for the occupant to feel insecure.

The present invention is not limited to the above embodiments and variation, and capable of substitutions without departing from the scope of the claims.

The foregoing description of embodiments is merely examples, and the scope of the present invention should not be construed to be limiting. The scope of the present invention should be defined by the appended claims, and all the modifications and changes which fall within the scope of equivalents of the appended claims are within the scope of the present invention.

INDUSTRIAL APPLICABILITY

The present invention is useful for a vehicle acceleration/deceleration controller that controls the acceleration and deceleration of a vehicle in the direction of travel thereof from the entry of the vehicle into a curve to the exit of the vehicle from the curve.

DESCRIPTION OF REFERENCE CHARACTERS

1 Vehicle
16 ECU (Vehicle Acceleration/Deceleration Controller)
20 Curve Shape Information Obtaining Unit
22 Occupant Condition Obtaining Unit
24 Driving Environment Obtaining Unit
26 Vehicle Condition Obtaining Unit
28 Target Acceleration/Deceleration Setting Unit
30 Acceleration/Deceleration Control Unit
32 Acceleration/Deceleration Correction Factor Map

The invention claimed is:

1. A vehicle control device for a vehicle, the vehicle control device comprising:
a brake of the vehicle;
an engine of the vehicle; and
a vehicle acceleration/deceleration controller that controls an acceleration and deceleration of the vehicle in a direction of travel of the vehicle from entry of the vehicle into a curve to exit of the vehicle from the curve, the vehicle acceleration/deceleration controller comprising:
a curve shape information obtaining unit configured to obtain shape information including a radius of curvature of the curve in front of the vehicle;
a target acceleration/deceleration setting unit configured to set target accelerations and decelerations of the vehicle in the direction of travel of the vehicle between a location at which the curve starts and a location at which the curve ends; and
an acceleration/deceleration control unit configured to, when the vehicle travels from the location at which the curve starts to the location at which the curve ends, control the acceleration and deceleration of the vehicle in the direction of travel of the vehicle in accordance with the target accelerations and decelerations set by the target acceleration/deceleration setting unit, wherein
the acceleration/deceleration control unit controls the brake and the engine,
the target acceleration/deceleration setting unit
sets one of the target accelerations and decelerations at the location at which the curve starts to be a predetermined maximum deceleration,
sets another one of the target accelerations and decelerations at the location at which the curve ends to be a predetermined maximum acceleration,
sets still another one of the target accelerations and decelerations at a predetermined intermediate location between the location at which the curve starts and the location at which the curve ends to be zero,
sets a target deceleration D (Ld) at a location to which a travelling distance from the location at which the curve starts is Ld between the location at which the curve starts and the predetermined intermediate location to satisfy a following expression (1):

$$D\max \cdot (1 - Ld/L1) \leq D(Ld) \leq D\max \cdot \cos(\pi Ld/2L1)$$

where Dmax represents the predetermined maximum deceleration, and L1 represents a travelling distance between the location at which the curve starts and the predetermined intermediate location, and
sets a target acceleration A (La) at a location to which a travelling distance from the predetermined intermediate location is La between the predetermined intermediate location and the location at which the curve ends to satisfy a following expression (2):

$$A\max \cdot La/L2 \leq A(La) \leq A\max \cdot \sin(\pi La/2L2)$$

where Amax represents the predetermined maximum acceleration, and L2 represents a travelling distance between the predetermined intermediate location and the location at which the curve ends.

2. The vehicle control device of claim 1, wherein the predetermined intermediate location at which the target acceleration/deceleration setting unit sets the target acceleration and deceleration to be zero is a location at which the radius of curvature of the curve is smallest.

3. The vehicle control device of claim 1, wherein the predetermined intermediate location at which the target acceleration/deceleration setting unit sets the target acceleration and deceleration to be zero is a location between the location at which the curve starts and a location at which the radius of curvature of the curve is smallest.

4. The vehicle control device of claim 1, wherein the predetermined intermediate location at which the target acceleration/deceleration setting unit sets the target acceleration and deceleration to be zero is a location between the location at which the curve ends and a location at which the radius of curvature of the curve is smallest.

5. The vehicle control device of claim 1, wherein the predetermined maximum deceleration set as the one of the target accelerations and decelerations at the location at which the curve starts by the target acceleration/deceleration setting unit is a deceleration having a magnitude equal to that of a maximum lateral acceleration that may be applied to the vehicle during cornering.

6. The vehicle control device of claim 1, wherein the target acceleration/deceleration setting unit sets the target accelerations and decelerations so that a plot of travelling distance along a horizontal axis against acceleration and deceleration along a vertical axis results in a sinusoidal curve from the location at which the curve starts to the location at which the curve ends.

7. A vehicle control device for a vehicle, the vehicle control device comprising:
a brake of the vehicle;
an engine of the vehicle; and
a vehicle acceleration/deceleration controller that controls an acceleration and deceleration of the vehicle in a direction of travel of the vehicle from entry of the vehicle into a curve to exit of the vehicle from the curve, the vehicle acceleration/deceleration controller comprising:
a curve shape information obtaining unit configured to obtain shape information including a radius of curvature of the curve in front of the vehicle;
a target acceleration/deceleration setting unit configured to set target accelerations and decelerations of the vehicle in the direction of travel of the vehicle between a location at which the curve starts and a location at which the curve ends;
an acceleration/deceleration control unit configured to, when the vehicle travels from the location at which the curve starts to the location at which the curve ends, control the acceleration and deceleration of the vehicle in the direction of travel of the vehicle in accordance with the target accelerations and decelerations set by the target acceleration/deceleration setting unit; and
an occupant condition obtaining unit configured to obtain a condition of an occupant in the vehicle, wherein
the acceleration/deceleration control unit controls the brake and the engine,
the target acceleration/deceleration setting unit
sets one of the target accelerations and decelerations at the location at which the curve starts to be a predetermined maximum deceleration,
sets another one of the target accelerations and decelerations at the location at which the curve ends to be a predetermined maximum acceleration,
sets still another one of the target accelerations and decelerations at a predetermined intermediate location between the location at which the curve starts and the location at which the curve ends to be zero,
sets a target deceleration D (Ld) at a location to which a travelling distance from the location at which the curve starts is Ld between the location at which the curve starts and the predetermined intermediate location to satisfy a following expression (1):

$$D\max\cdot(1-Ld/L1) \leq D(Ld) \leq D\max\cdot\cos(\pi Ld/2L1)$$

where Dmax represents the predetermined maximum deceleration, and L1 represents a travelling distance between the location at which the curve starts and the predetermined intermediate location,
sets a target acceleration A (La) at a location to which a travelling distance from the predetermined intermediate location is La between the predetermined intermediate location and the location at which the curve ends to satisfy a following expression (2):

$$A\max\cdot La/L2 \leq A(La) \leq A\max\cdot\sin(\pi La/2L2)$$

where Amax represents the predetermined maximum acceleration, and L2 represents a travelling distance between the predetermined intermediate location and the location at which the curve ends, and
the target acceleration/deceleration setting unit sets the target deceleration D (Ld) within a range satisfying the expression (1) in accordance with the condition of the occupant in the vehicle obtained by the occupant condition obtaining unit, and sets the target acceleration A (La) within a range satisfying the expression (2) in accordance with the condition of the occupant in the vehicle obtained by the occupant condition obtaining unit.

8. The vehicle control device of claim 7, wherein
the occupant condition obtaining unit is configured to obtain information for determining whether or not the occupant is in good physical condition as the condition of the occupant in the vehicle and determine whether or not the occupant is in good physical condition, based on the obtained information, and
the target acceleration/deceleration setting unit is configured to, if the occupant condition obtaining unit determines that the occupant is in good physical condition, set the target deceleration D (Ld) and the target acceleration A (La) to be closer to Dmax·cos($\pi$Ld/2L1) and Amax·sin($\pi$La/2L2), respectively, than if the occupant condition obtaining unit determines that the occupant is not in good physical condition.

9. The vehicle control device of claim 7, wherein
the occupant condition obtaining unit is configured to obtain information for determining whether or not the occupant tends to perform quick operations as the condition of the occupant in the vehicle and determine whether or not the occupant tends to perform quick operations, based on the obtained information, and
the target acceleration/deceleration setting unit is configured to, if the occupant condition obtaining unit determines that the occupant tends to perform quick operations, set the target deceleration D (Ld) and the target acceleration A (La) to be closer to Dmax·cos($\pi$Ld/2L1) and Amax·sin($\pi$La/2L2), respectively, than if the occupant condition obtaining unit determines that the occupant does not tend to perform quick operations.

10. The vehicle control device of claim 9, further comprising
a storage unit configured to store accelerations applied to the vehicle by driving operations of the occupant, wherein
the occupant condition obtaining unit is configured to obtain information on the accelerations applied to the vehicle by the occupant's past driving operations stored in the storage unit and determine whether or not the occupant tends to perform quick operations, based on the obtained information on the acceleration.

11. A vehicle control device for a vehicle, the vehicle control device comprising:
a brake of the vehicle;
an engine of the vehicle; and
a vehicle acceleration/deceleration controller that controls an acceleration and deceleration of the vehicle in a direction of travel of the vehicle from entry of the vehicle into a curve to exit of the vehicle from the curve, the vehicle acceleration/deceleration controller comprising:
a curve shape information obtaining unit configured to obtain shape information including a radius of curvature of the curve in front of the vehicle;
a target acceleration/deceleration setting unit configured to set target accelerations and decelerations of the vehicle in the direction of travel of the vehicle between a location at which the curve starts and a location at which the curve ends;
an acceleration/deceleration control unit configured to, when the vehicle travels from the location at which the curve starts to the location at which the curve ends, control the acceleration and deceleration of the vehicle in the direction of travel of the vehicle in accordance with the target accelerations and decelerations set by the target acceleration/deceleration setting unit; and a vehicle condition obtaining unit configured to obtain a condition of the vehicle, wherein the acceleration/deceleration control unit controls the brake and the engine, the target acceleration/deceleration setting unit sets one of the target accelerations and decelerations at the location at which the curve starts to be a predetermined maximum deceleration, sets another one of the target accelerations and decelerations at the location at which the curve ends to be a predetermined maximum acceleration, sets still another one of the target accelerations and decelerations at a predetermined intermediate location between the location at which the curve starts and the location at which the curve ends to be zero, sets a target deceleration D (Ld) at a location to which a travelling distance from the location at which the curve starts is Ld between the location at which the curve starts and the predetermined intermediate location to satisfy a following expression (1):

$$D\text{max}\cdot(1-Ld/L1) \leq D(Ld) \leq D\text{max}\cdot\cos(\pi Ld/2L1)$$

where Dmax represents the predetermined maximum deceleration, and L1 represents a travelling distance between the location at which the curve starts and the predetermined intermediate location, sets a target acceleration A (La) at a location to which a travelling distance from the predetermined intermediate location is La between the predetermined intermediate location and the location at which the curve ends to satisfy a following expression (2):

$$A\text{max}\cdot La/L2 \leq A(La) \leq A\text{max}\cdot\sin(\pi La/2L2)$$

where Amax represents the predetermined maximum acceleration, and L2 represents a travelling distance between the predetermined intermediate location and the location at which the curve ends, the target acceleration/deceleration setting unit sets the target deceleration D (Ld) within a range satisfying the expression (1) in accordance with the condition of the vehicle obtained by the vehicle condition obtaining unit, and sets the target acceleration A (La) within a range satisfying the expression (2) in accordance with the condition of the vehicle obtained by the vehicle condition obtaining unit, the vehicle condition obtaining unit is configured to obtain a parameter of the vehicle as the condition of the vehicle, and the target acceleration/deceleration setting unit is configured to set the target deceleration D (Ld) and the target acceleration A (La) such that the lower or higher the parameter obtained by the vehicle condition obtaining unit is, the closer to $D\text{max}\cdot\cos(\pi Ld/2L1)$ the target deceleration D (Ld) is, and the closer to $A\text{max}\cdot\sin(\pi La/2L2)$ the target acceleration A (La) is.

12. The vehicle control device of claim 11, wherein the vehicle condition obtaining unit is configured to obtain a speed of the vehicle as the condition of the vehicle, and the target acceleration/deceleration setting unit is configured to set the target deceleration D (Ld) and the target acceleration A (La) such that the lower the speed obtained by the vehicle condition obtaining unit is, the closer to $D\text{max}\cdot\cos(\pi Ld/2L1)$ the target deceleration D (Ld) is, and the closer to $A\text{max}\cdot\sin(\pi La/2L2)$ the target acceleration A (La) is.

13. The vehicle control device of claim 11, wherein the vehicle condition obtaining unit is configured to obtain the number of occupants riding in the vehicle as the condition of the vehicle, and the target acceleration/deceleration setting unit sets the target deceleration D (Ld) and the target acceleration A (La) such that the smaller the number of the occupants obtained by the vehicle condition obtaining unit is, the closer to $D\text{max}\cdot\cos(\pi Ld/2L1)$ the target deceleration D (Ld) is, and the closer to $A\text{max}\cdot\sin(\pi La/2L2)$ the target acceleration A (La) is.

14. The vehicle control device of claim 11, wherein the vehicle condition obtaining unit is configured to obtain a weight of a load carried by the vehicle as the condition of the vehicle, and the target acceleration/deceleration setting unit is configured to set the target deceleration D (Ld) and the target acceleration A (La) such that the lower the weight of the load obtained by the vehicle condition obtaining unit is, the closer to $D\text{max}\cdot\cos(\pi Ld/2L1)$ the target deceleration D (Ld) is, and the closer to $A\text{max}\cdot\sin(\pi La/2L2)$ the target acceleration A (La) is.

15. A vehicle control device for a vehicle, the vehicle control device comprising:

a brake of the vehicle;

an engine of the vehicle; and a vehicle acceleration/deceleration controller that controls an acceleration and deceleration of the vehicle in a direction of travel of the vehicle from entry of the vehicle into a curve to exit of the vehicle from the curve, the vehicle acceleration/deceleration controller comprising:

a curve shape information obtaining unit configured to obtain shape information including a radius of curvature of the curve in front of the vehicle;

a target acceleration/deceleration setting unit configured to set target accelerations and decelerations of the vehicle in the direction of travel of the vehicle between a location at which the curve starts and a location at which the curve ends;

an acceleration/deceleration control unit configured to, when the vehicle travels from the location at which the curve starts to the location at which the curve ends, control the acceleration and deceleration of the vehicle in the direction of travel of the vehicle in accordance with the target accelerations and decelerations set by the target acceleration/deceleration setting unit; and a driving environment obtaining unit configured to obtain a driving environment of the vehicle, wherein the acceleration/deceleration control unit controls the brake and the engine, the target acceleration/deceleration setting unit sets one of the target accelerations and decelerations at the location at which the curve starts to be a predetermined maximum deceleration, sets another one of the target accelerations and decelerations at the location at which the curve ends to be a predetermined maximum acceleration, sets still another one of the target accelerations and decelerations at a predetermined intermediate location between the location at which the curve starts and the location at which the curve ends to be zero, sets a target deceleration D (Ld) at a location to which a travelling distance from the location at which the curve starts is Ld between the location at which the curve starts and the predetermined intermediate location to satisfy a following expression (1):

$$D\max \cdot (1 - Ld/L1) \leq D(Ld) \leq D\max \cdot \cos(\pi Ld/2L1)$$

where Dmax represents the predetermined maximum deceleration, and L represents a travelling distance between the location at which the curve starts and the predetermined intermediate location, sets a target acceleration A (La) at a location to which a travelling distance from the predetermined intermediate location is La between the predetermined intermediate location and the location at which the curve ends to satisfy a following expression (2):

$$A\max \cdot La/L2 \leq A(La) \leq A\max \cdot \sin(\pi La/2L2)$$

where Amax represents the predetermined maximum acceleration, and L2 represents a travelling distance between the predetermined intermediate location and the location at which the curve ends, the target acceleration/deceleration setting unit is configured to set the target deceleration D (Ld) within a range satisfying the expression (1) in accordance with the driving environment of the vehicle obtained by the driving environment obtaining unit, and set the target acceleration A (La) within a range satisfying the expression (2) in accordance with the driving environment of the vehicle obtained by the driving environment obtaining unit, the driving environment obtaining unit is configured to obtain information for determining whether or not a parameter of the environment exists as the driving environment of the vehicle, and determine whether or not the parameter of the environment exists, based on the obtained information, and the target acceleration/deceleration setting unit is configured to, if the driving environment obtaining unit determines that a particular parameter of the environment exists, set the target deceleration D (Ld) and the target acceleration A (La) to be closer to Dmax·cos (πLd/2L1) and Amax·sin(πLa/2L2), respectively, than if the driving environment obtaining unit determines that the particular parameter of the environment does not exist.

16. The vehicle control device of claim 15, wherein
the driving environment obtaining unit is configured to obtain information for determining whether or not a period when the vehicle travels on the curve is during a daytime as the driving environment of the vehicle, and determine whether or not the period is during the daytime, based on the obtained information, and the target acceleration/deceleration setting unit is configured to, if the driving environment obtaining unit determines that the period is during the daytime, set the target deceleration D (Ld) and the target acceleration A (La) to be closer to Dmax·cos(πLd/2L1) and Amax·sin (πLa/2L2), respectively, than if the driving environment obtaining unit determines that the period is not during the daytime.

17. The vehicle control device of claim 15, wherein
the driving environment obtaining unit is configured to obtain information for determining whether or not the curve has high visibility as the driving environment of the vehicle, and determine whether or not the curve has high visibility, based on the obtained information, and the target acceleration/deceleration setting unit is configured to, if the driving environment obtaining unit determines that the curve has high visibility, set the target deceleration D (Ld) and the target acceleration A (La) to be closer to Dmax·cos(πLd/2L1) and Amax·sin (πLa/2L2), respectively, than if the curve does not have high visibility.

18. The vehicle control device of claim 15, wherein
the driving environment obtaining unit is configured to obtain information for determining whether or not a traffic density of the curve is high as the driving environment of the vehicle, and determine whether or not the traffic density of the curve is high, based on the obtained information, and the target acceleration/deceleration setting unit is configured to, if the driving environment obtaining unit determines that the traffic density of the curve is not high, set the target deceleration D (Ld) and the target acceleration A (La) to be closer to Dmax·cos(πLd/2L1) and Amax·sin(πLa/2L2), respectively, than if the driving environment obtaining unit determines that the traffic density is high.

19. The vehicle control device of claim 15, wherein
the driving environment obtaining unit is configured to obtain information for determining a condition of a road surface of the curve as the driving environment of the vehicle, and determine whether or not the road surface of the curve has a high friction coefficient, based on the obtained information, and the target acceleration/deceleration setting unit is configured to, if the driving environment obtaining unit determines that the road surface of the curve has a high friction coefficient, set the target deceleration D (Ld) and the target acceleration A (La) to be closer to Dmax·cos(πLd/2L1) and Amax·sin(πLa/2L2), respectively, than if the driving environment obtaining unit determines that the road surface of the curve does not have a high friction coefficient.

* * * * *